United States Patent
Otsuka et al.

(10) Patent No.: US 11,054,587 B1
(45) Date of Patent: *Jul. 6, 2021

(54) OPTICAL CONNECTOR

(71) Applicants: SUMITOMO ELECTRIC INDUSTRIES, LTD., Osaka (JP); Japan Communication Accessories Manufacturing Co., Ltd., Komaki (JP); Steve Cheng, Emerald Hills, CA (US)

(72) Inventors: Kenichiro Otsuka, Osaka (JP); Motoyoshi Kimura, Komaki (JP); Masaki Omura, Osaka (JP); Steve Cheng, Emerald Hills, CA (US)

(73) Assignees: SUMITOMO ELECTRIC INDUSTRIES, LTD., Osaka (JP); Japan Communication Accessories Manufacturing Co., Ltd., Komaki (JP); Steve Cheng, Emerald Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,421

(22) Filed: Jan. 29, 2020

(51) Int. Cl.
*G02B 6/38* (2006.01)

(52) U.S. Cl.
CPC .......... *G02B 6/3871* (2013.01); *G02B 6/387* (2013.01); *G02B 6/3866* (2013.01); *G02B 6/3887* (2013.01); *G02B 6/3893* (2013.01)

(58) Field of Classification Search
CPC ..... G02B 6/3871; G02B 6/3866; G02B 6/387
See application file for complete search history.

(56) References Cited

U.S. PATENT DOCUMENTS

| | | | | |
|---|---|---|---|---|
| 10,527,803 | B1* | 1/2020 | Otsuka | G02B 6/3871 |
| 10,768,376 | B2* | 9/2020 | Otsuka | G02B 6/3885 |
| 2011/0047731 | A1* | 3/2011 | Sugita | G02B 6/3807 |
| | | | | 15/97.1 |
| 2015/0293310 | A1 | 10/2015 | Kanno | |
| 2019/0235182 | A1 | 8/2019 | Cheng | |

OTHER PUBLICATIONS

Notice of Allowance dated Aug. 30, 2019 that issued in U.S. Appl. No. 16/174,692.
Office Action dated Mar. 26, 2019 that issued in U.S. Appl. No. 16/174,692.

* cited by examiner

*Primary Examiner* — Sung H Pak
(74) *Attorney, Agent, or Firm* — Faegre Drinker Biddle & Reath LLP

(57) ABSTRACT

An optical connector is disclosed. The optical connector includes a rear housing, an inner housing, and an outer housing. The inner housing includes a retaining hole to accommodate a ferrule. The outer housing is disposed on an outer periphery of the inner housing to cover a front portion of the inner housing. The outer housing rotates about the central axis with respect to the inner housing by a rotation guiding mechanism cooperating with an adapter for connecting the optical connector to another optical connector. The outer housing includes a front wall covering the distal end of the inner housing. The front wall includes at least one opening region. The opening region corresponds to a fiber exposed surface of the ferrule when the outer housing is rotated with respect to the inner housing from an initial position to a connected position by the rotation guiding mechanism.

20 Claims, 29 Drawing Sheets

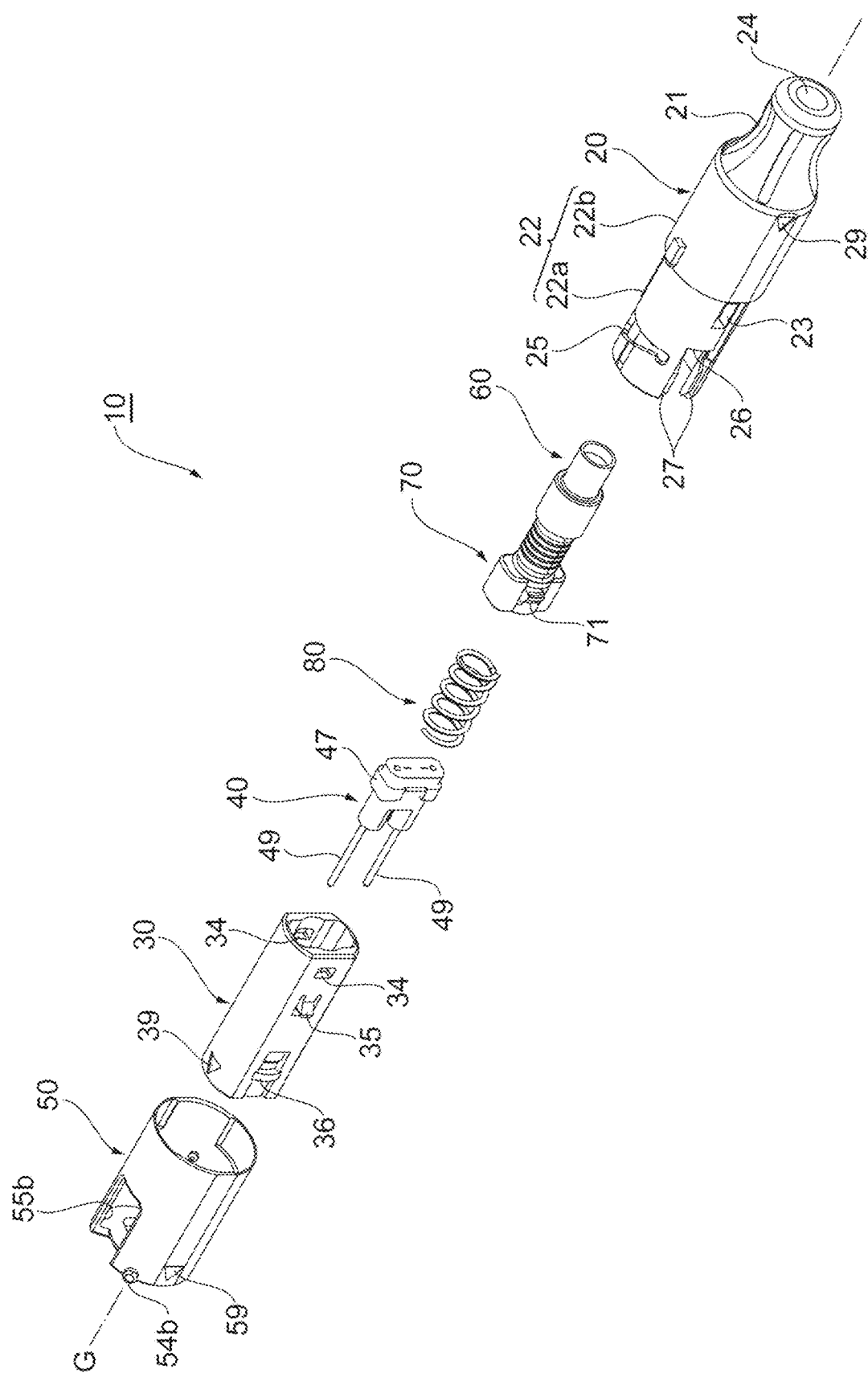

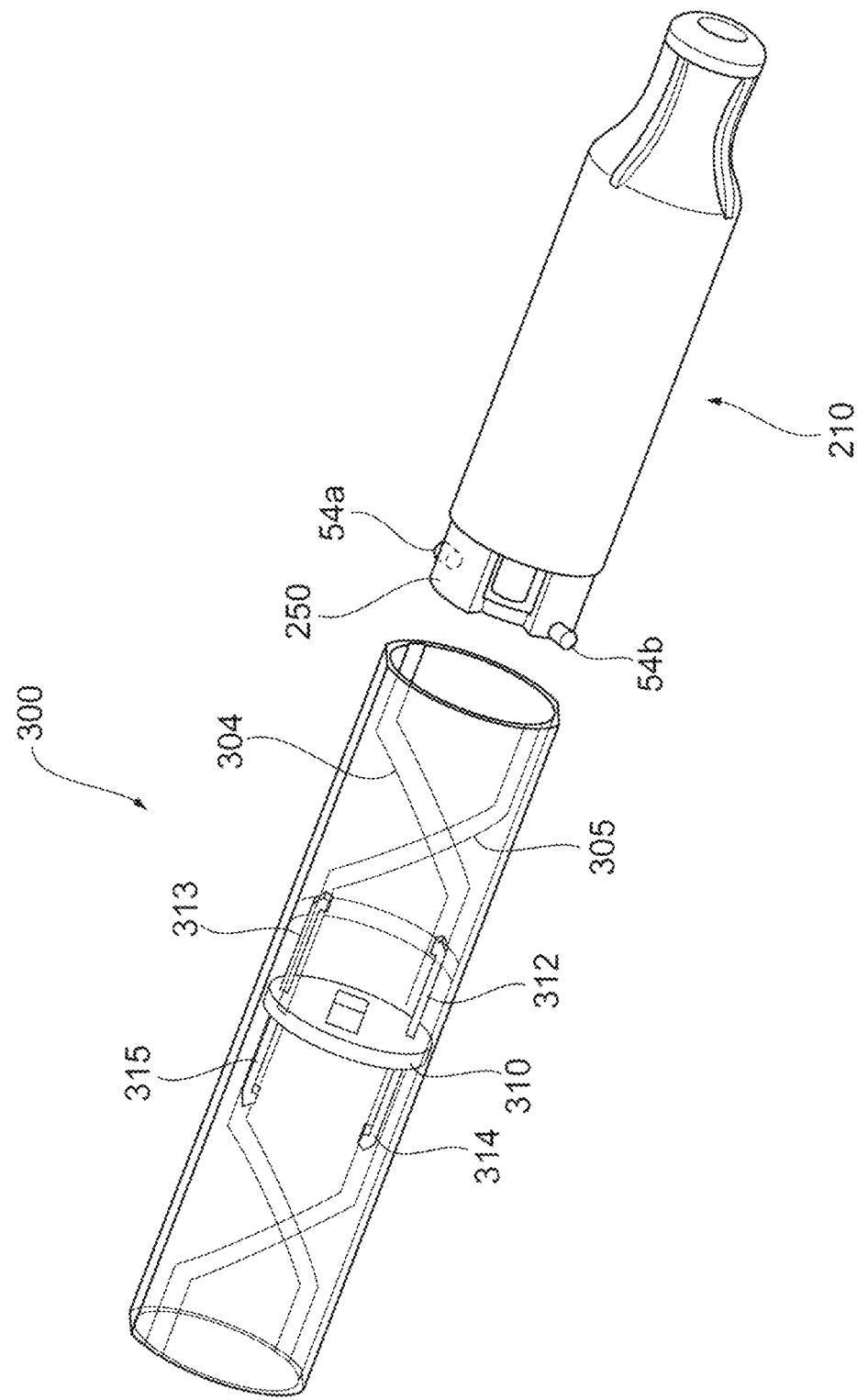

OPTICAL CONNECTOR

SUMMARY

This disclosure provides an optical connector which has a central axis extending between a front end and a rear end. The optical connector includes a rear housing, an inner housing, and an outer housing. The rear housing is located at the rear end of the optical connector. The rear housing allows an optical fiber cable to be inserted therethrough. The inner housing has at least one retaining hole configured to accommodate a ferrule at a distal end thereof. A rear portion of the inner housing is accommodated in the rear housing. The outer housing is disposed on an outer periphery of the inner housing to cover a front portion of the inner housing. The outer housing is configured to rotate with respect to the inner housing about the central axis by a rotation guiding mechanism cooperating with an adapter for connecting the optical connector to another optical connector. The outer housing includes a front wall which covers the distal end of the inner housing. At least one opening region is provided in the front wall. The opening region is configured to correspond to a fiber exposed surface of the ferrule when the outer housing is rotated with respect to the inner housing from an initial position to a connected position by the rotation guiding mechanism.

This disclosure also provides an optical connecting structure. The optical connecting structure includes the optical connector and the adapter. The adapter is configured to connect the optical connector to another optical connector.

BRIEF DESCRIPTION OF THE DRAWINGS

The foregoing and other purposes, aspects and advantages will be better understood from the following detailed description of embodiments of the present disclosure with reference to the drawings, in which:

FIG. 3 is an exploded perspective view of the optical connector illustrated in FIG. 2;

FIG. 11A is a view showing a position of the ferrule when the guide protrusion is in a first straight portion of the guide groove, FIG. 11B is a view showing a position of the ferrule when the guide protrusion is in an inclined portion of the guide groove, and FIG. 11C is a view showing a position of the ferrule when the guide protrusion is in a second straight portion of the guide groove;

FIG. 23 is a perspective view showing connection of the optical connector illustrated in FIGS. 18A and 18B to the adapter illustrated in FIGS. 22A and 22B;

DETAILED DESCRIPTION

Figure 1:
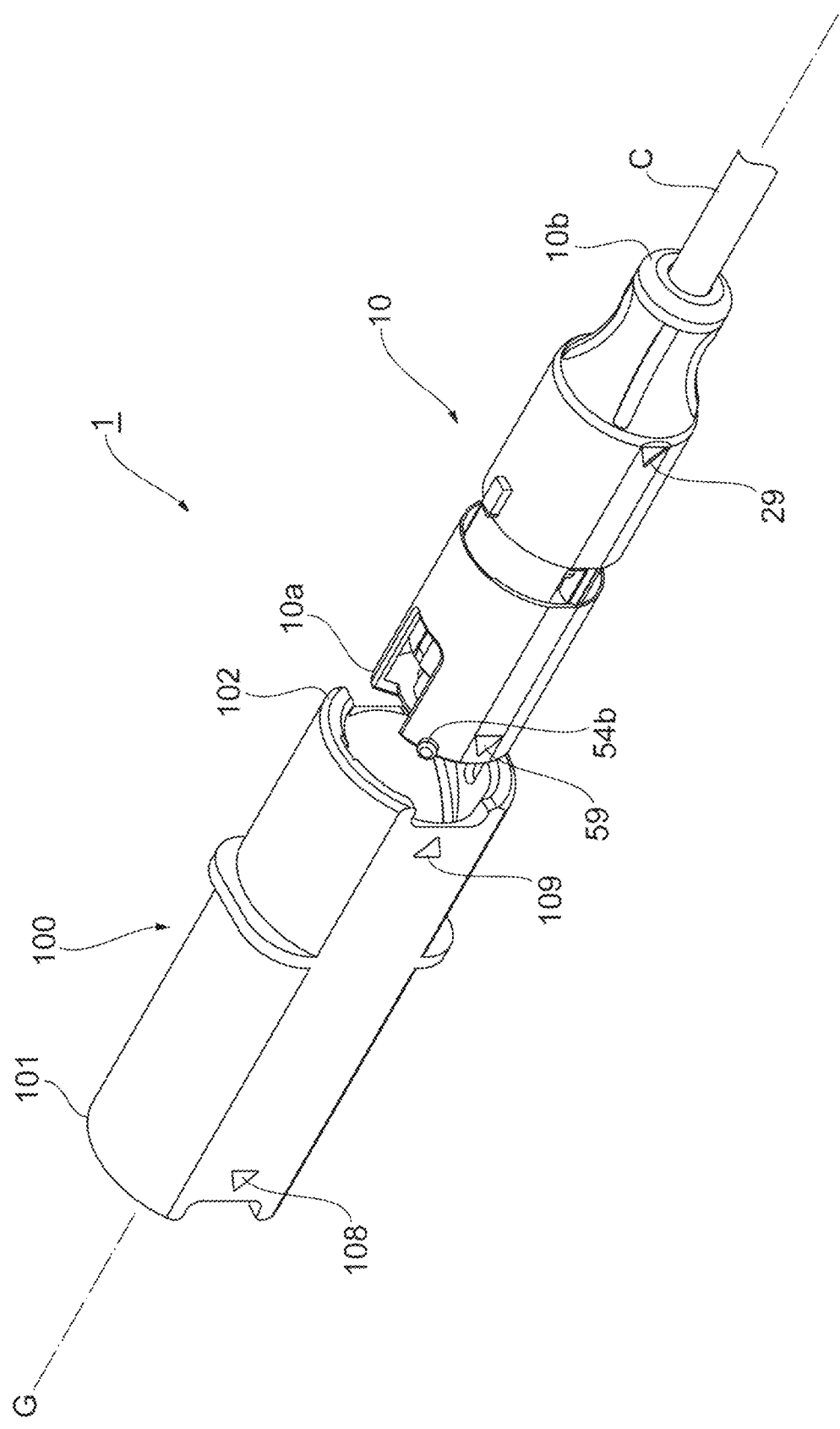
FIG. 1 is a perspective view of an optical connecting structure according to a first embodiment.

Description of Embodiment According to this Disclosure

Embodiments according to this disclosure will be listed and described. An optical connector according to one embodiment of this disclosure is an optical connector having a central axis which extends between a front end and a rear end. The optical connector includes a rear housing, an inner housing, and an outer housing. The rear housing is located at the rear end of the optical connector and allows the optical fiber cable to be inserted therethrough. The inner housing has at least one retaining hole configured to accommodate a ferrule at a distal end thereof, and a rear portion of the inner housing is accommodated in the rear housing. The outer housing is disposed on an outer periphery of the inner housing to cover a front portion of the inner housing. The outer housing is configured to rotate with respect to the inner housing about the central axis by a rotation guiding mechanism which cooperates with an adapter for connecting the optical connector to another optical connector. The outer housing includes a front wall which covers the distal end of the inner housing. At least one opening region is provided in the front wall. The opening region is configured to correspond to a fiber exposed surface of the ferrule when the outer housing is rotated with respect to the inner housing from an initial position to a connected position by the rotation guiding mechanism.

In the optical connector, when the outer housing is rotated from the initial position to the connected position (a rotated position) with respect to the inner housing by the rotation guiding mechanism, the opening region of the front wall of the outer housing moves to a position corresponding to the fiber exposed surface of the ferrule. Therefore, when the optical connector is rotated from the initial position to the connected position to connect the optical connector to another connector, since a distal end of the ferrule, that is, a distal end of the optical fiber held by the ferrule is exposed to the outside (since it is protected until then), it is possible to curb adhesion of dust to an end surface of the optical fiber. Further, since the outer housing is rotated using the rotation guiding mechanism, an operation thereof is easy.

In one embodiment, the rotation guiding mechanism may include a guide protrusion located on an outer surface of the outer housing. For example, the outer housing is rotated between the initial position and the connected position with respect to the inner housing by the guide protrusion moving in a guide groove in the adapter. According to this embodiment, a rotation guiding mechanism having a simple structure is provided.

In one embodiment, the rotation guiding mechanism may include a pair of guide protrusions located on an outer surface of the outer housing. For example, the outer housing may be rotated between the initial position and the connected position with respect to the inner housing by each of the guide protrusions moving in a corresponding guide groove in the adapter. According to this embodiment, a rotation guiding mechanism having a simple structure is provided.

In one embodiment, the pair of guide protrusions may be located adjacent to a front end of the optical connector. A rotation angle of the outer housing can be increased by disposing each of the guide protrusions adjacent to the front end of the optical connector.

In one embodiment, the pair of guide protrusions may be symmetrically located with respect to the central axis. Accordingly, the outer housing can smoothly rotate due to the guide protrusions.

In one embodiment, the optical connector may further include a resilient member which presses the outer housing toward the front end and presses the rear housing toward the rear end. According to this embodiment, the resilient member may cause the outer housing and the rear housing to be easily restored to the initial position when an engagement of the adapter with respect to the inner housing is released.

In one embodiment, the outer housing may include a cleaner inside the front wall. The cleaner may clean a distal end of the optical fiber. According to this embodiment, when the optical connector is rotated from the initial position to the connected position to connect the optical connector to other optical connector, the distal end of the ferrule may be cleaned by the cleaner. The cleaner may be wound around the front wall through the opening region.

In one embodiment, the optical connector may further include a ferrule which accommodates a distal end portion of at least one of the optical fibers accommodated in the optical fiber cable. A recess may be provided at a center of the front end of the ferrule. For example, when the optical connector having the above-described configuration is downsized, in the case of the ferrule of the related art, the rotation of the outer housing may be hindered. However, downsizing of the optical connector is easily achieved by employing the configuration of the ferrule with a central portion removed, which may otherwise hinder the rotation, as in the embodiment.

In one embodiment, the optical connector may further include an optical fiber cable in which a plurality of optical fibers are accommodated, and a holding member which holds the optical fiber cable inside the rear housing. The optical fiber cable may be inserted through the rear housing.

A connecting structure according to one embodiment of this disclosure includes any one of the above-described optical connectors, and an adapter configured to connect the optical connector to another optical connector.

In one embodiment, the rotation guiding mechanism may include a guide groove provided in an inner peripheral surface of the adapter, and a guide protrusion located on an outer peripheral surface of the outer housing. The guide groove may include an inclined portion which is inclined with respect to the central axis. The guide protrusion may protrude toward the guide groove. In the connecting structure, the outer housing may rotate with respect to the inner housing between the initial position and the connected position due to a movement of the guide protrusion in the guide groove.

In one embodiment, the rotation guiding mechanism may include a pair of guide grooves provided in an inner peripheral surface of the adapter, and a pair of guide protrusions located on an outer peripheral surface of the outer housing. The respective guide grooves may comprise an inclined portion which is inclined with respect to the central axis. The respective guide protrusions may protrude toward the corresponding guide grooves. In the connecting structure, the outer housing may rotate with respect to the inner housing between the initial position and the connected position due to movements of the guide protrusions in the corresponding guide grooves.

In one embodiment, each of the pair of guide grooves may include a first straight portion and a second straight portion which extend respectively from both ends of the inclined portion along the central axis.

In one embodiment, the adapter may further include a latch member which is engaged with the inner housing of the optical connecter. Accordingly, the optical connector is firmly attached to the adapter.

In one embodiment, the rear housing of the optical connector may further include a releasing portion having a slope which releases the latch member of the adapter after the optical connector is inserted into the adapter and locked to the adapter by the latch member.

In one embodiment, the releasing portion may have a protruding shape toward outside of the optical connector, and the protruding shape may include the slope.

In one embodiment, the rear housing may further include a cutout configured to expose a protrusion of the inner housing. The protrusion may be configured to engage with the latch member of the adapter. The releasing portion may be disposed adjacent to an edge of the cutout.

A method of connecting the optical connector to another optical connector using an adapter according to one embodiment of this disclosure includes the following steps:
(a) aligning a first structure of the rotation guiding mechanism provided on the outer housing with a second structure of the rotation guiding mechanism provided on the adapter,
(b) linearly moving the outer hosing toward the adapter along the central axis after Step (a), and
(c) converting the linear movement of the outer housing into a rotational movement of the outer housing by the rotational guiding mechanisms provided on the outer housing and the adapter and rotating the outer housing from the initial position to the connected position, wherein the fiber exposed surface of the ferrule is located in the opening region provided in the front wall of the outer housing in Step (c), and the fiber exposed surface of the ferrule protrudes from the front wall toward an inside of the adapter.

A method of releasing the optical connector connected to another optical connector from the adapter according to one embodiment of this disclosure includes the following step:
(d) pulling the rear housing or the outer housing away from the adapter and rotating the outer housing from the connected position to the initial position by the rotation guiding mechanism.

Details of Embodiment of this Disclosure

Specific examples of the optical connector and the optical connecting structure according to an embodiment of this disclosure will be described below with reference to the drawings. The present invention is not limited to these examples but is defined by the scope of the claims and is intended to include all modifications within the scope and meaning equivalent to the scope of the claims. In the following description, the same reference numerals are given to the same elements in the description of the drawings, and overlapping descriptions will be omitted as appropriate.

First Embodiment

FIG. 1 is a perspective view showing an optical connecting structure according to a first embodiment. As illustrated in FIG. 1, the optical connecting structure 1 includes an optical connector 10 and an adapter 100. In the optical connecting structure 1, when the optical connector 10 is inserted into the adapter 100 and locked at a predetermined position, the optical connector 10 can be optically connected to another optical connector. The other optical connector 40A is inserted into the adapter 100 from the side opposite to the optical connector 10 along a central axis G (refer to FIG. 11C).

Figure 2:
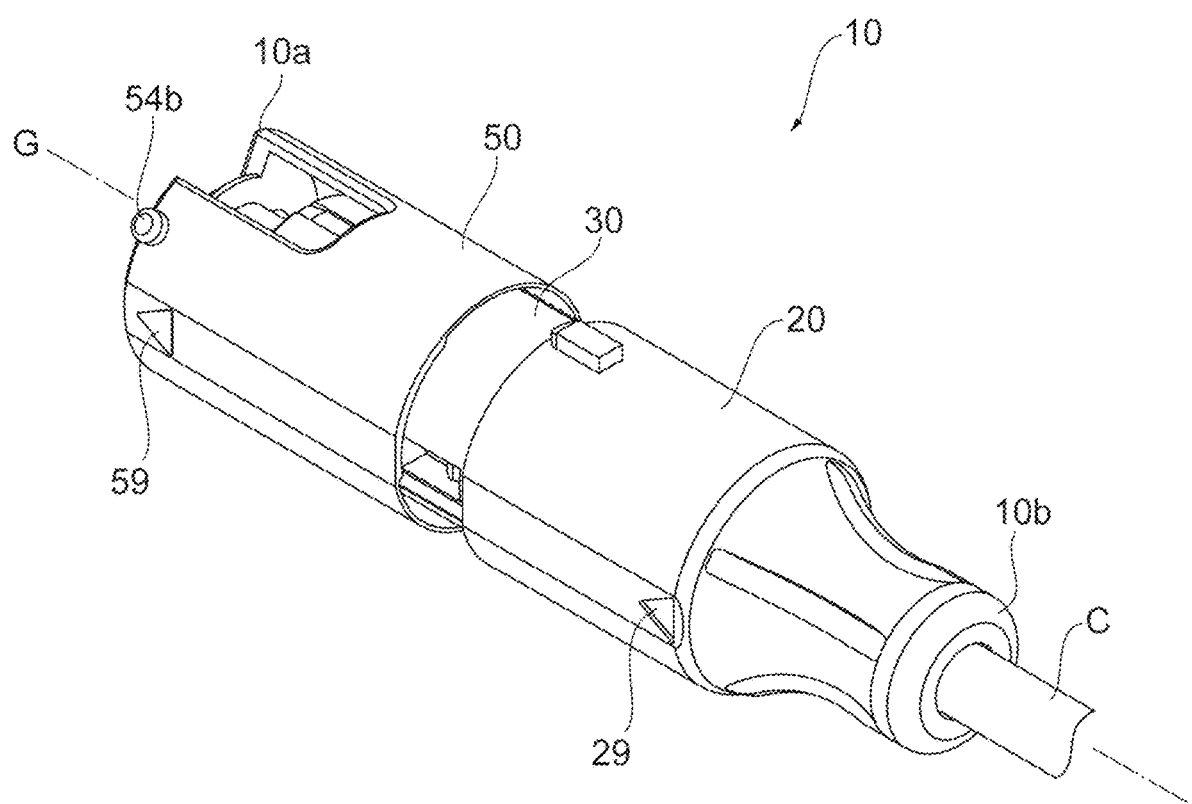
FIG. 2 is a perspective view of an optical connector included in the optical connecting structure illustrated in FIG. 1.

FIG. 2 is a perspective view showing the optical connector according to the embodiment. FIG. 3 is an exploded perspective view of the optical connector illustrated in FIG. 2. As illustrated in FIGS. 2 and 3, the optical connector 10 is a substantially cylindrical member which extends along a central axis G extending from a front end 10a toward a rear end 10b and includes a rear housing 20, an inner housing 30, an MT ferrule 40, an outer housing 50, a caulking ring 60, an MT rear 70, and an MT spring 80. In the optical connector 10, the inner housing 30, the MT ferrule 40, the caulking ring 60, the MT rear 70, and the MT spring 80 are accommodated inside the rear housing 20 and the outer housing 50. Further, a pair of spacing springs 38 are disposed on a side surface of the inner housing 30 (refer to FIG. 12B), and thus the rear housing 20 and the outer housing 50 are biased in directions away from (repelling) each other. In the optical connector 10, the optical fiber cable C is inserted into the connector through the rear housing 20 and is held in the optical connector 10 by the MT rear 70 and the caulking ring 60. The optical fiber cable C accommodates a large number (in one example, 8 cores) of optical fibers therein. Distal end portions of the optical fibers exposed from a distal end of the optical fiber cable C are held by the MT ferrule 40, and fiber exposed ends are exposed from a front end face of the MT ferrule 40.

In the optical connector 10, although details will be described later, when the outer housing 50 rotates by a predetermined angle (for example, 90 degrees) about the central axis G with respect to the rear housing 20, the inner housing 30, and the MT ferrule 40 in cooperation with the adapter 100, exposed surfaces of the optical fibers held by the MT ferrule 40 protrude from a distal end of the outer housing 50. The optical connector 10 can be connected to another optical connector in the adapter 100 by such a rotation operation (refer to, for example, FIGS. 12B and 13B). At this time, the outer housing 50 moves rearward along the central axis G with respect to the inner housing 30 and the like. Although the MT ferrule accommodated in another optical connector has the same configuration as the MT ferrule 40, the MT ferrule does not have a guide pin but has a guide hole (corresponding to a guide hole 48) in which the guide pin of the MT ferrule 40 is inserted. Thus, both ferrules are aligned with each other. Further, in the following description, the side to which the MT ferrule 40 protrudes may be referred to as "front (end)" or "forward," and the side into which the optical fiber cable C is inserted may be referred to as "rear (end)" or "rearward."

Figure 4A:
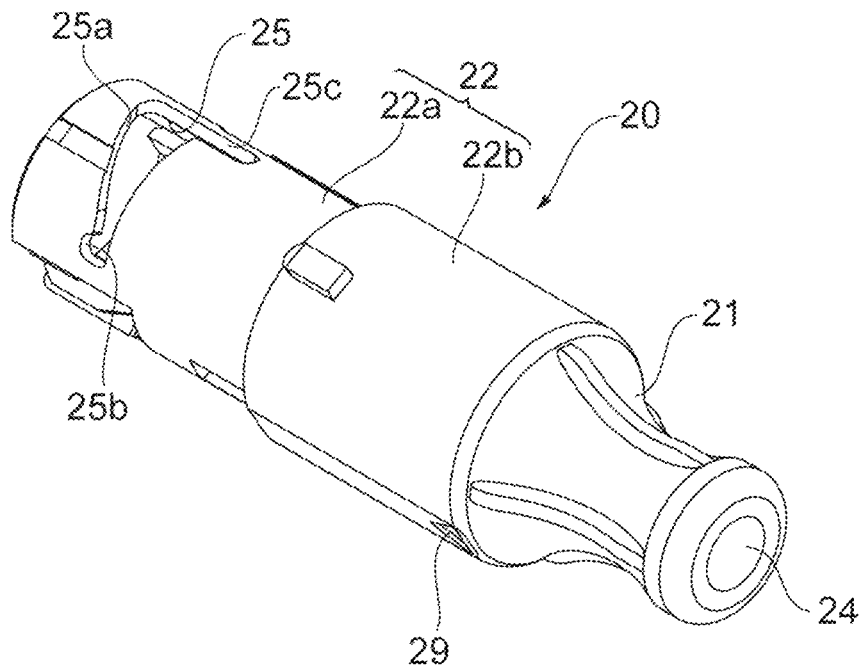
FIGS. 4A and 4B are perspective views of a rear housing of the optical connector illustrated in FIG. 2.
Figure 4B:
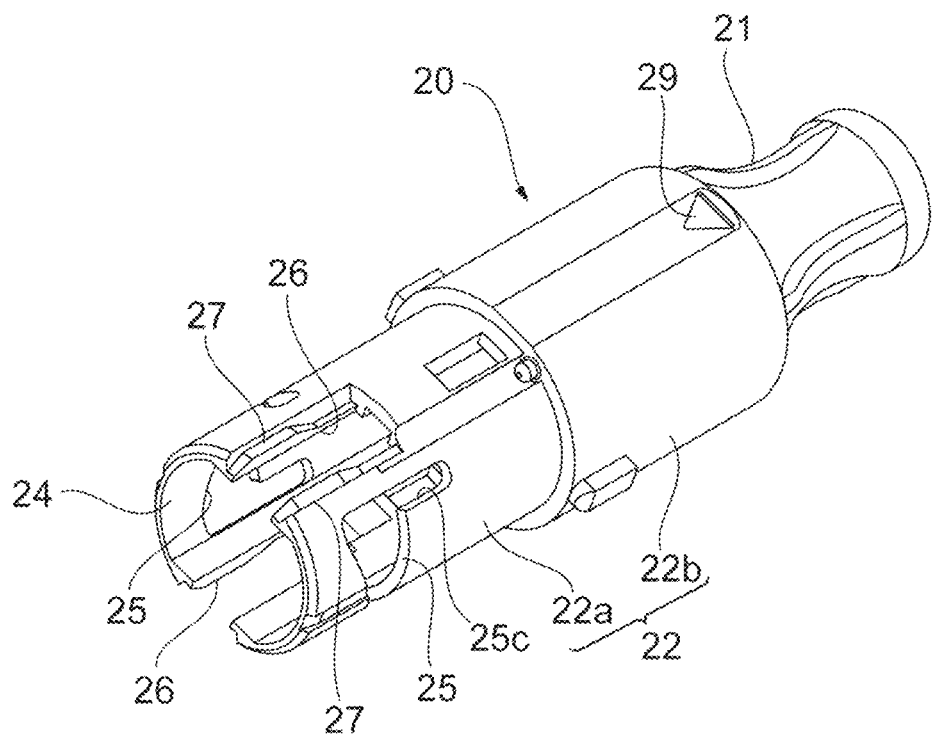

As illustrated in FIGS. 2 and 3, the rear housing 20 is a member which is disposed adjacent to the rear end 10b of the optical connector 10 and inserts the optical fiber cable C therethrough. FIGS. 4A and 4B are perspective views of the rear housing 20, FIG. 4A is a perspective view of the rear housing 20 when seen from the rear, and FIG. 4B is a perspective view of the rear housing when seen from the front. As illustrated in FIGS. 2 to 4B, the rear housing 20 includes a boot portion 21 having an inner hole into which the optical fiber cable C or the optical fiber is inserted, and a housing portion 22 formed in communication with the boot portion 21 and having an outer diameter larger than that of the boot portion 21. An outer shape of the housing portion 22 is substantially cylindrical and includes a first housing portion 22a on the front side and a second housing portion 22b on the rear side. Since the first housing portion 22a is accommodated in the outer housing 50, an outer diameter thereof is smaller than that of the second housing portion 22b. The optical fiber cable C is not fixed to the rear housing 20, passes through the MT rear 70 accommodated in the rear housing 20 and is fixed into the MT rear 70 by the caulking ring 60 screwed into the MT rear 70. The MT rear 70 is fixed to the inner housing 30 by fitting a pair of protrusions 71 into a pair of openings 34 on the rear end side of the inner housing 30.

The rear housing 20 has a pair of openings 23 in a region adjacent to the second housing portion 22b of the first housing portion 22a. The pair of openings 23 are provided at point-symmetric positions about the central axis G. When the inner housing 30 is inserted and disposed in a through hole 24 passing through the rear housing 20, a pair of protrusions 35 of the inner housing 30 are engaged with the pair of openings 23, and thus the inner housing 30 is positioned with respect to the rear housing 20. Since each of the openings 23 has a predetermined length along the central axis G, the inner housing 30 can move a predetermined distance along the central axis G with respect to the rear housing 20.

The rear housing 20 further includes a pair of guide openings 25 in the vicinity of a front end of the first housing portion 22a. The pair of guide openings 25 have a point-symmetric shape about the central axis G, and each of the guide openings 25 includes a substantially triangular portion 25a, and straight portions 25b and 25c which extend from both ends thereof in opposite directions along the central axis G. When a front portion of the rear housing 20 is accommodated in the outer housing 50, guide protrusions 56a and 56b provided point-symmetrically on an inner peripheral surface of the outer housing 50 are located in each of the guide openings 25. When the outer housing 50 rotates with respect to the rear housing 20 and the inner housing 30, movement of the outer housing 50 in a rotational direction and a linear movement thereof in the direction along the central axis G are guided by the guide protrusions 56a and 56b moving along an edge in the guide openings 25.

In the rear housing 20, a pair of cutouts 26 are further provided in front of the central axis G of the pair of openings 23 and between the pair of guide openings 25 in a circumferential direction. Each of the cutouts 26 is provided point-symmetrically with respect to the central axis G and is formed to extend along the central axis G. A pair of projecting portions 27 which extend along the central axis G are provided on both edges of each of the cutouts 26. The pair of projecting portions 27 are thin plate-shaped portions which extend along the central axis G and have a trapezoidal shape in a side view. Each of the projecting portions 27 has a first slope 27a on the rear end side, a flat portion 27b on a center, and a second slope 27c on the front end side (refer FIG. 15). When the optical connector 10 is inserted and locked into the adapter 100, latches 112 and 113 of a latch member 110 are respectively located in the cutouts 26, and the latches 112 and 113 are engaged with latch steps 36 of the inner housing 30 corresponding to the cutouts 26. Thus, the optical connector 10 is connected to the adapter 100. The pair of projecting portions 27 are used when the latch engagement is released. Details will be described later.

The rear housing 20 having the above-described configuration may be formed of a resin material such as polycarbonate (PC), polyetherimide (PEI), polyamide (PA), polyacetal (PQM), polyphenylene ether (PPE), polybutylene terephthalate (PBT) or polyethersulfone (PES) and has predetermined toughness and low frictional sliding characteristics. The inner housing 30, the outer housing 50, the adapter 100, or the like may also be formed of the same material.

Figure 5A:
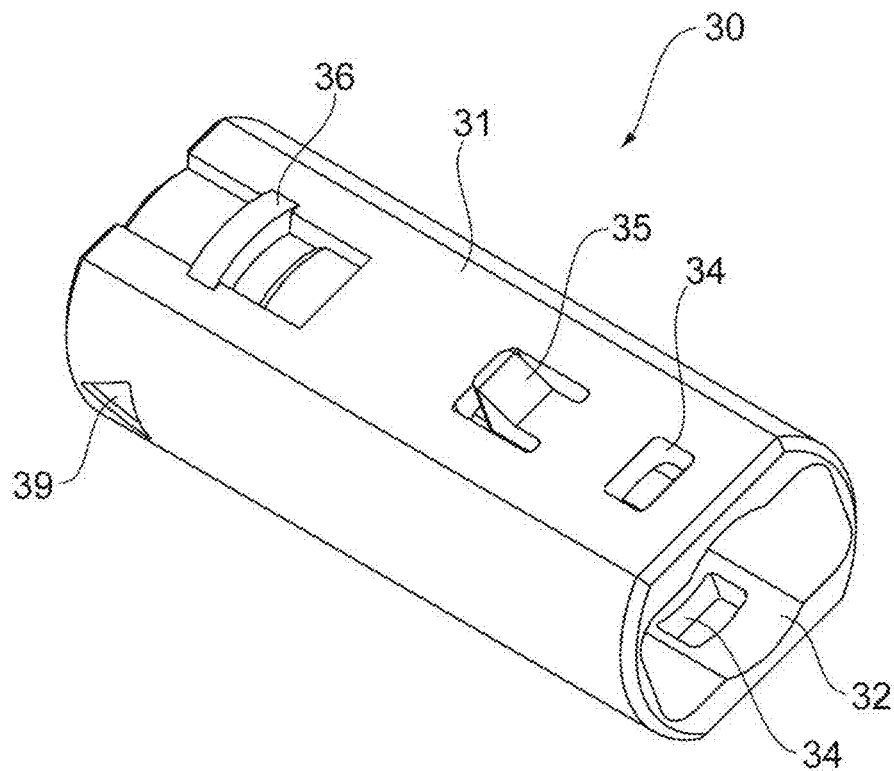
FIGS. 5A and 5B are perspective views of an inner housing of the optical connector illustrated in FIG. 2.
Figure 5B:
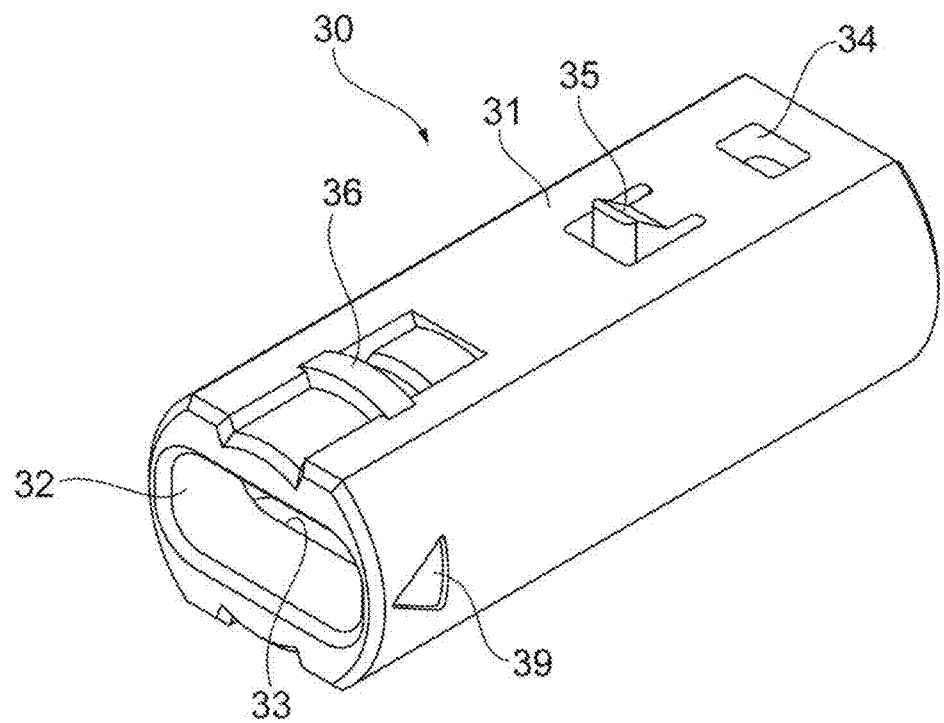

As illustrated in FIGS. 2 to 3 and FIGS. 5A to 5B, the inner housing 30 has a substantially elliptic cylindrical shape and has a pair of flat surfaces 31 on an outer surface thereof. Both flat surfaces 31 are parallel to each other. FIGS. 5A and 5B are perspective views of the inner housing 30, FIG. 5A is a perspective view of the inner housing 30 when seen from the rear, and FIG. 5B is a perspective view of the inner housing 30 when seen from the front. A through hole 32 which extends from the front end toward the rear end is provided in the inner housing 30. A step 33 is provided in the vicinity of the front end of the through hole 32, and an opening region of the through hole 32 in front of the step 33 is narrowed. With such a configuration, a front portion of the MT ferrule 40 inserted from a rear end of the inner housing 30 can protrude from a front end of the inner housing 30. The MT ferrule 40 is biased forward by the MT spring 80 disposed behind the MT ferrule 40. The through hole 32 having the step 33 serves as a holding hole for accommodating the ferrule 40. Further, the MT rear 70 for biasing the MT ferrule 40 forward by the MT spring 80 is inserted from a rear end of the through hole 32.

The pair of openings 34 and the pair of protrusions 35 are provided at a rear end of an outer peripheral surface of the inner housing 30. Although FIGS. 5A and 5B disclose one opening 34 and one protrusion 35, the other opening 34 and protrusion 35 disposed in a point symmetry with respect to the central axis G or a rotational symmetry with respect to the central axis G also have the same configuration. A pair of protrusions 71 of the MT rear 70 are engaged with the pair of openings 34. Due to this engagement, the MT ferrule is accommodated in the inner housing 30 in a state in which the MT ferrule is biased forward. Further, the pair of protrusions 35 are disposed in the pair of openings 23 of the rear housing 20 in a slidable state. Accordingly, the inner housing 30 can move linearly along the central axis G at a certain distance with respect to the rear housing 20.

A pair of latch steps 36 are provided at a front end of an outer surface of the inner housing 30. Although FIGS. 5A and 5B disclose one latch step 36, the other latch step 36 disposed in a point symmetry with respect to the central axis G or a rotational symmetry with respect to the central axis G also has the same configuration. When the optical connector 10 is connected to the adapter 100, the latches 112 and 113 of the latch member 110 disposed in the adapter 100 are engaged with the pair of latch steps 36, respectively. Thus, the optical connector 10 including the inner housing 30 is fixed to the adapter 100.

Figure 6A:
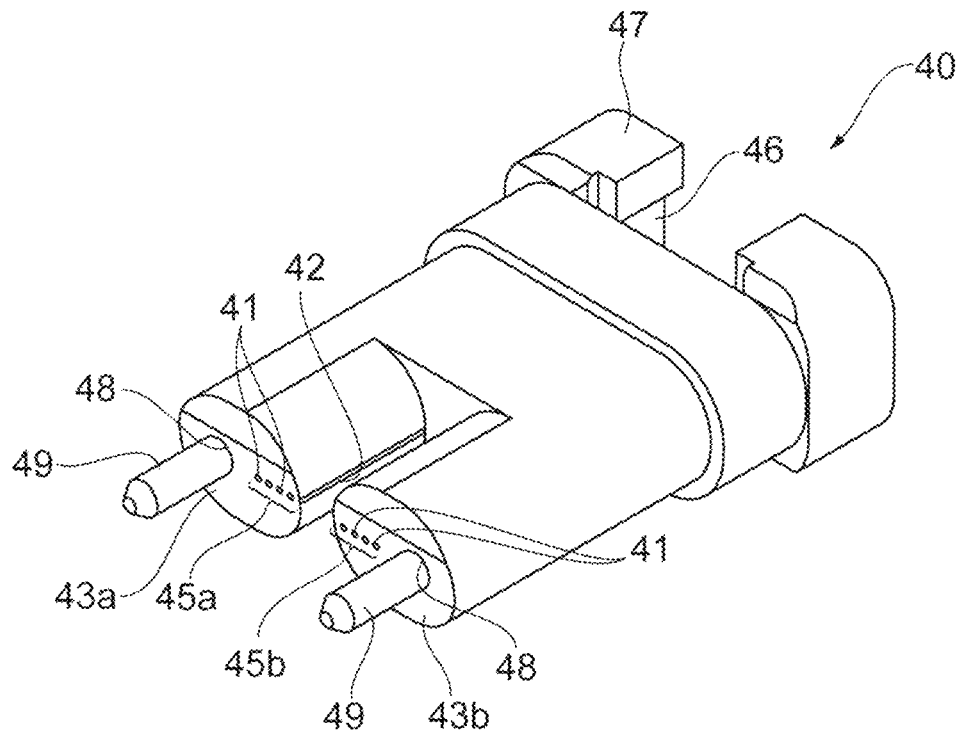
FIGS. 6A and 6B are perspective views of an MT ferrule of the optical connector illustrated in FIG. 2.
Figure 6B:
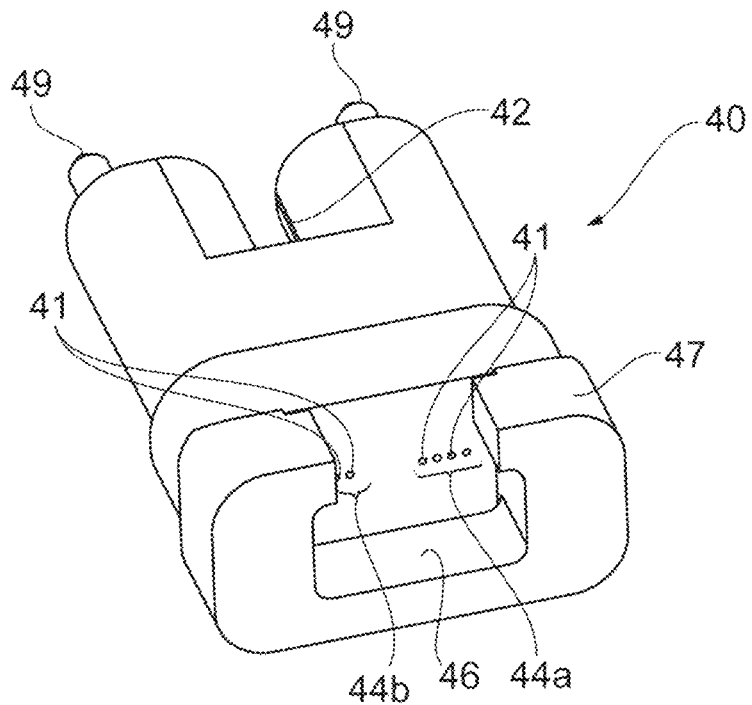

As illustrated in FIGS. 3 and 6A to 6B, the MT ferrule 40 is a member which has through holes 41 for accommodating a plurality of optical fibers and holds each of the optical fibers so that a distal end of each of the optical fibers is exposed from the front end thereof. The basic configuration of the MT ferrule 40 is the same as that of the MT ferrule of the related art, but as illustrated in FIGS. 6A and 6B, a recess 42 is provided in the vicinity of the central axis G at the front end. The MT ferrule 40 is divided into two exposed surfaces 43a and 43b by the recess 42. The distal ends of the optical fibers are respectively exposed from the exposed surfaces 43a and 43b. Each of the optical fibers is inserted into each of the through holes 41 from openings 44a and 44b of the MT ferrule 40 on the rear end side and is held by the MT ferrule 40 so that the distal end of each of the optical fibers is exposed to openings 45a and 45b which are distal ends of the through holes 41 (that is, the distal ends of the optical fibers coincide with the exposed surfaces 43a and 43b).

The MT ferrule 40 has a flange 47 having a recess 46 on the rear end side thereof. A distal end of the MT spring 80 is accommodated in the recess 46 of the flange 47, and thus the MT ferrule 40 is biased forward. At that time, since the flange 47 is caught by the step 33 inside the inner housing 30, the MT ferrule 40 is held not to protrude further from the inner housing 30. Further, the MT ferrule 40 has a pair of guide holes 48 (non-through holes) which extend from the front end toward the rear end. The guide holes 48 are respectively located outside the openings 45a and 45b through which the optical fiber is exposed. In the MT ferrule 40 of the optical connector 10, for example, guide pins 49 are inserted into the guide holes 48. In this case, there are no guide pins in the guide holes of the ferrule of the counterpart optical connector, and when the optical connector 10 is connected to another optical connector via the adapter 100, the guide pins 49 are inserted into the guide holes of the other optical connector, and axes of both optical connectors are aligned.

Figure 7A:
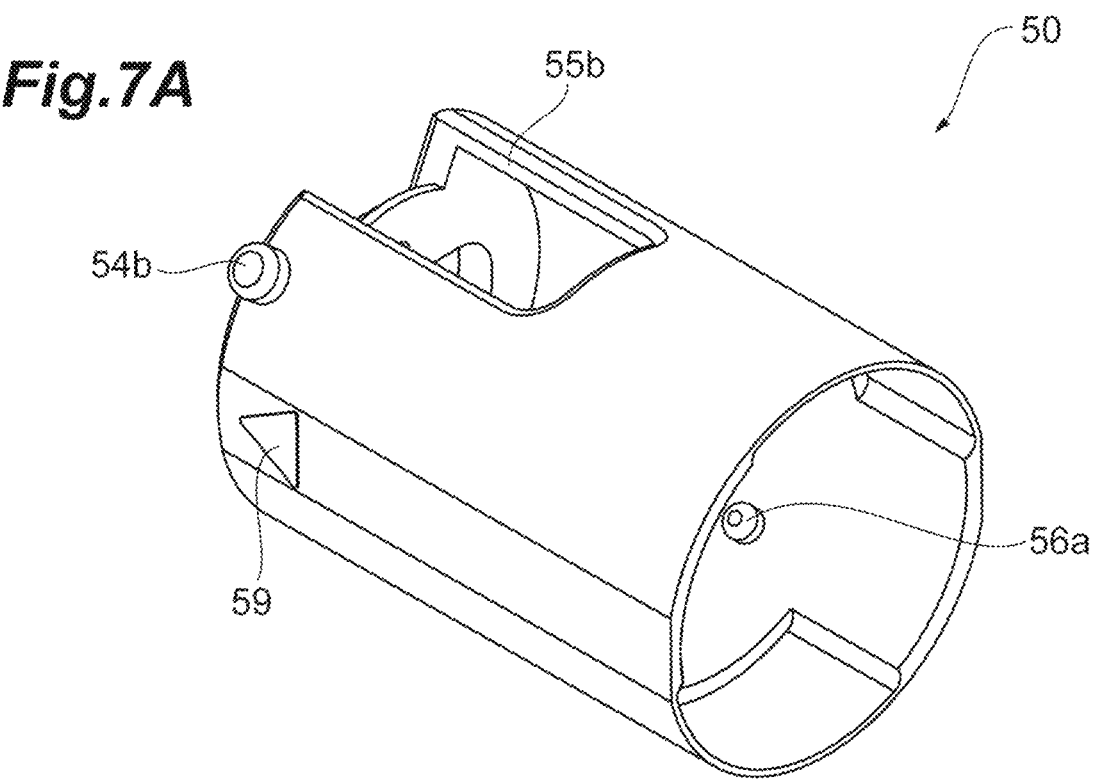
FIGS. 7A to 7C are perspective views of an outer housing of the optical connector illustrated in FIG. 2.
Figure 7B:
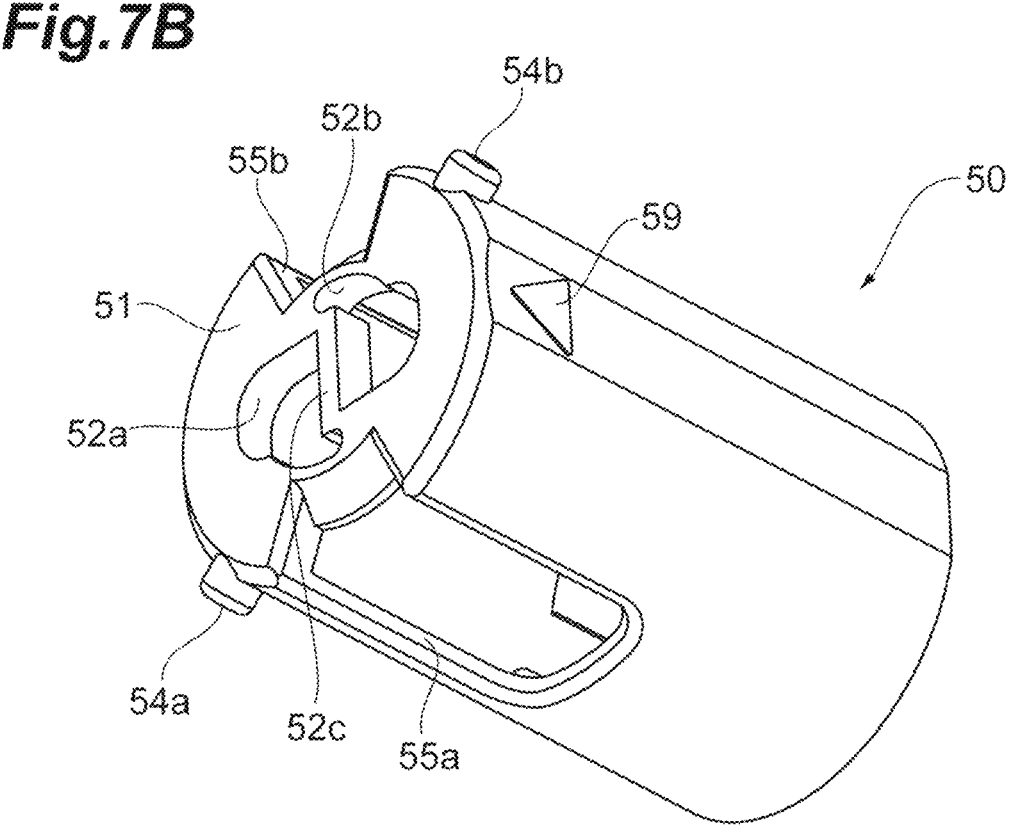
Figure 7C:
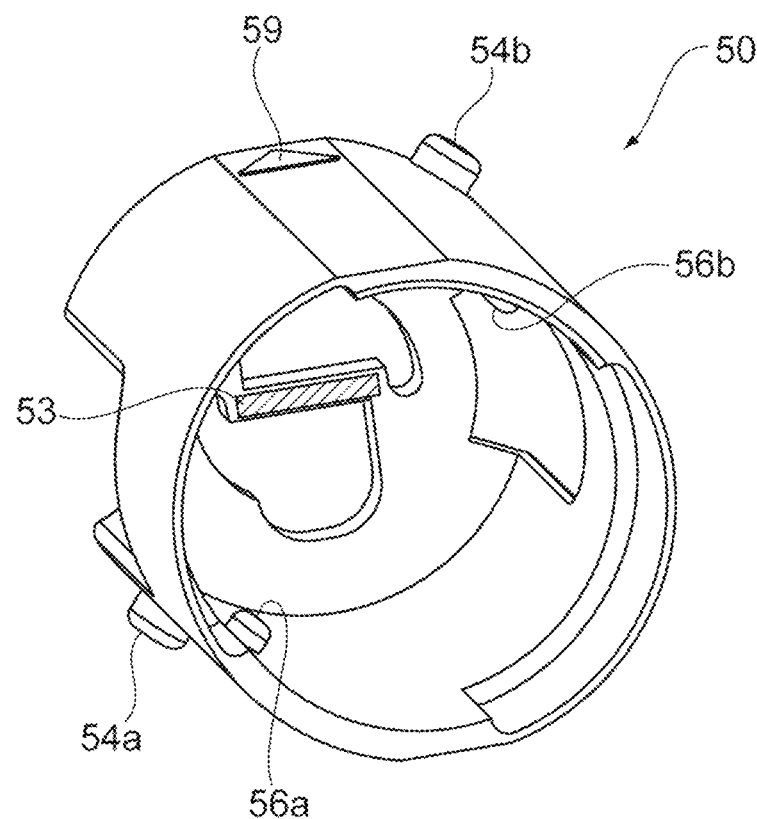
Figure 7D:
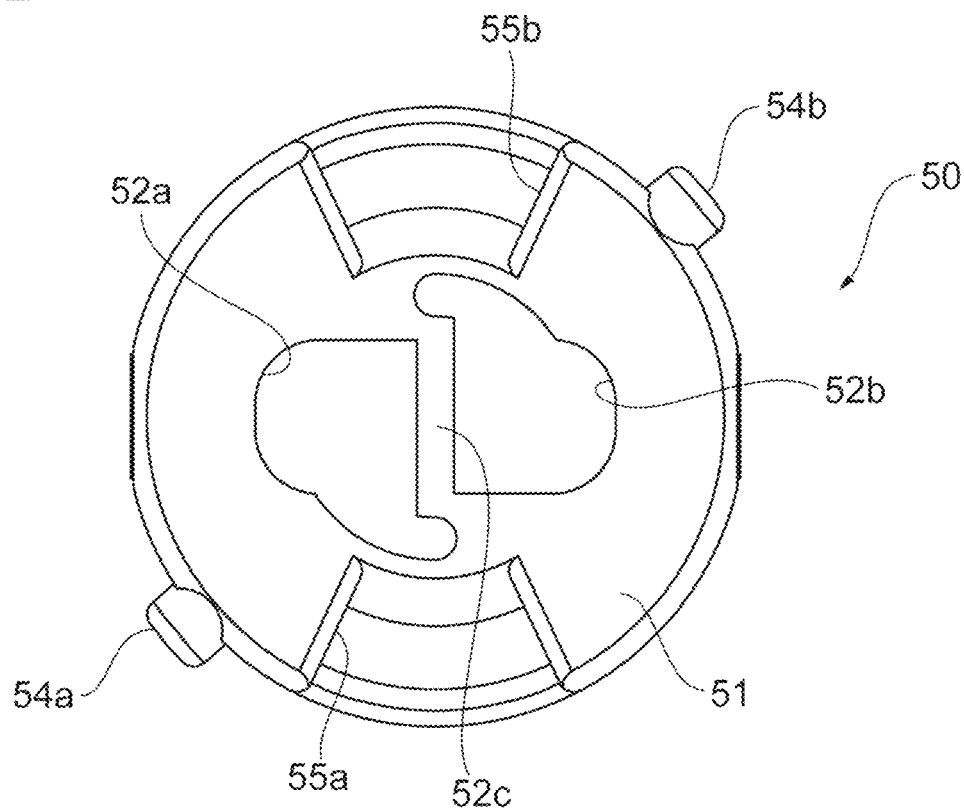
FIG. 7D is a front view of the outer housing when seen from the front.

As illustrated in FIGS. 2 to 3 and FIGS. 7A to 7D, the outer housing 50 is a member which is disposed to cover the outer periphery of the front portion of the inner housing 30 and has a front wall 51 which covers the fiber exposed surfaces 43a and 43b of the MT ferrule 40. FIGS. 7A to 7C are perspective views of the outer housing 50, and FIG. 7D is a front view of the outer housing 50 when seen from the front. As illustrated in FIGS. 7A to 7D, the outer housing 50 includes the front wall 51, opening regions 52a and 52b, a connecting portion 52c, a cleaner 53, a pair of guide protrusions 54a and 54b, opening portions 55a and 55b, and a pair of guide protrusions 56a and 56b.

The pair of guide protrusions 54a and 54b of the outer housing 50 are inserted into guide grooves 104 and 105 provided in an inner peripheral surface of the adapter 100. The outer housing 50 rotates about the central axis G with respect to the rear housing 20 or the inner housing 30 by the pair of guide protrusions 54a and 54b moving forward along the central axis G in the guide grooves 104 and 105 of the adapter 100. Further, at this time, the outer housing 50 moves rearward along the central axis G with respect to the rear housing 20 or the inner housing 30. The rotation and the rearward linear movement are guided by the movement of the pair of guide protrusions 56a and 56b inside the outer housing 50 within the guide openings 25 of the rear housing 20.

The outer housing 50 has a pair of opening regions 52a and 52b in the front wall 51 at the front end. The connecting portion 52c is provided between the pair of opening regions 52a and 52b. The connecting portion 52c is configured to move to a position corresponding to the recess 42 of the MT ferrule 40 when the outer housing 50 is rotated to this connected position. That is, the connecting portion 52c is accommodated in the recess 42 when rotated. On the other hand, a cleaner 53 for cleaning an end surface of the optical fiber is provided on a back surface of the connecting portion 52c (refer to FIG. 7C) and covers the exposed surface of the optical fiber (the openings 45a and 45b at the front end of the MT ferrule 40) in a normal state. Additionally, in the case in which the optical connector 10 is connected to the adapter 100, when the outer housing 50 rotates with respect to the inner housing 30 or the like, the outer housing 50 moves in a direction (rearward) approaching the inner housing 30 or the like, and the exposed surfaces of the optical fibers exposed from the openings 45a and 45b are cleaned using the rotation operation of the outer housing 50.

The cleaner 53 is slightly separated from the exposed surfaces 43a and 43b at the front end of the MT ferrule 40 in the initial position. When the outer housing 50 rotates, the inner housing 30 slightly advances with respect to the outer housing 50, and a front end surface of the MT ferrule 40 is in close contact with the cleaner 53 by this advance. After that, when the outer housing 50 rotates continuously, the exposed surfaces 43a and 43b of the MT ferrule 40 in which the exposed surfaces 43a and 43b are in close contact with the cleaner 53 move toward the opening regions 52a and 52b of the outer housing 50, and the front end surface of the MT ferrule 40 is cleaned by the cleaner 53 by the rotation operation at that time. With this cleaning, a decrease in connection loss due to attached dust or the like is curbed when an optical connection is performed using the optical connector 10. The cleaner 53 is attached to an inner surface of the front wall 51 to be parallel to the front end surface of the MT ferrule 40 with a slight gap in the initial position, but when the front end surface of the MT ferrule 40 is an inclined surface, the cleaner 53 may be attached to the front wall 51 to be inclined with respect to a surface orthogonal to the central axis G. Further, the outer housing 50 may be formed of the same material as that of the rear housing 20 as described above, but may be formed of a transparent member (for example, a resin material of polycarbonate or polyetherimide) to make the position of the MT ferrule 40 visible from the outside.

Next, a configuration of the adapter 100 to which the optical connector 10 having the above-described configuration is connected will be described in detail with reference to FIGS. 1 and 8A to 8E. The adapter 100 is a member which optically couples the optical connector 10 to another optical connector while adjusting the connected position of each of the optical fibers of the optical connector 10 (that is, to coincide with the connected position of each of the optical fibers of the other optical connector). As illustrated in FIGS. 8A to 8E, the adapter 100 is a substantially cylindrical member and has a through hole 103 so that the front portion of each of the optical connectors can be accommodated from both a front end 101 and a rear end 102 along the central axis G. The latch member 110 is installed in the through hole 103 of the adapter 100 and connects each of the optical connectors to the adapter 100.

Figure 8A:
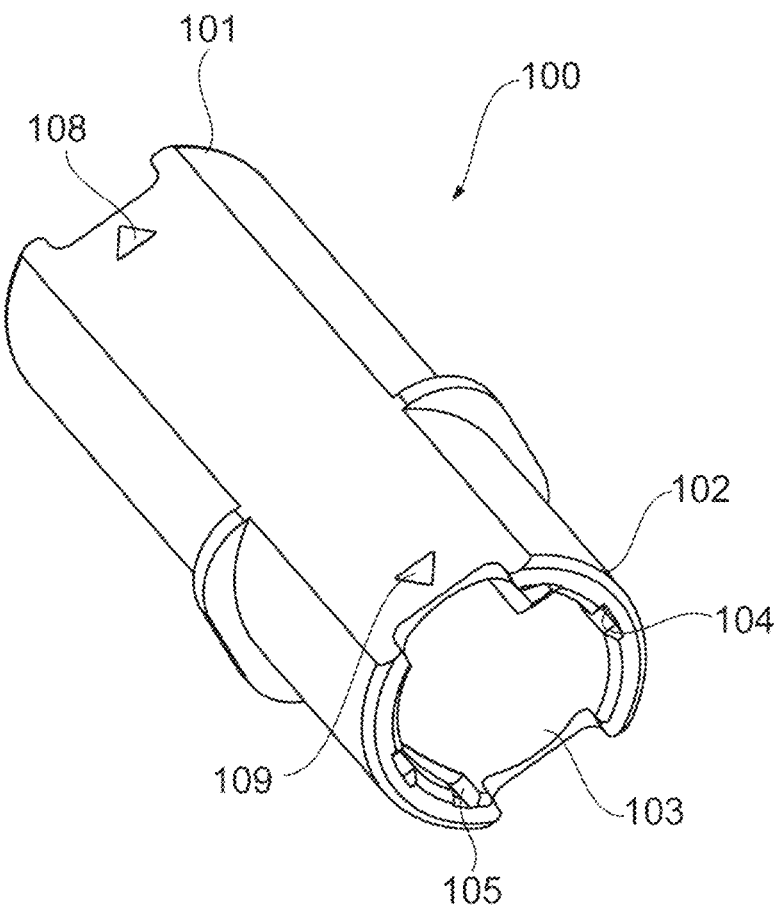
FIG. 8A is a perspective view of an adapter included in the optical connecting structure illustrated in FIG. 1.
Figure 8B:
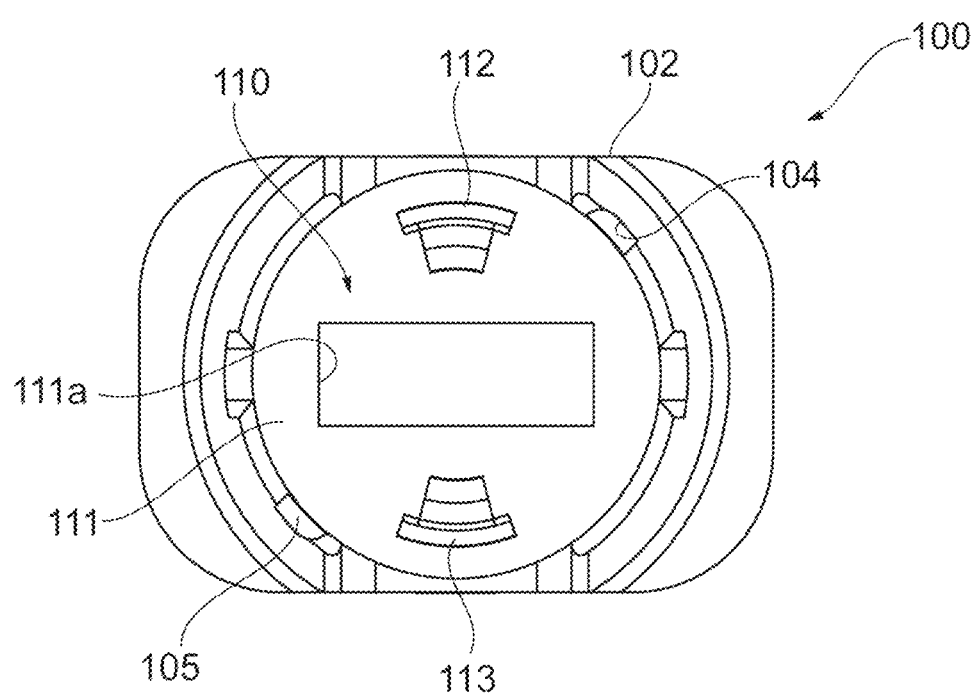
FIG. 8B is a rear view of the adapter when seen from the rear (the connection side with respect to the optical connector)
Figure 8C:
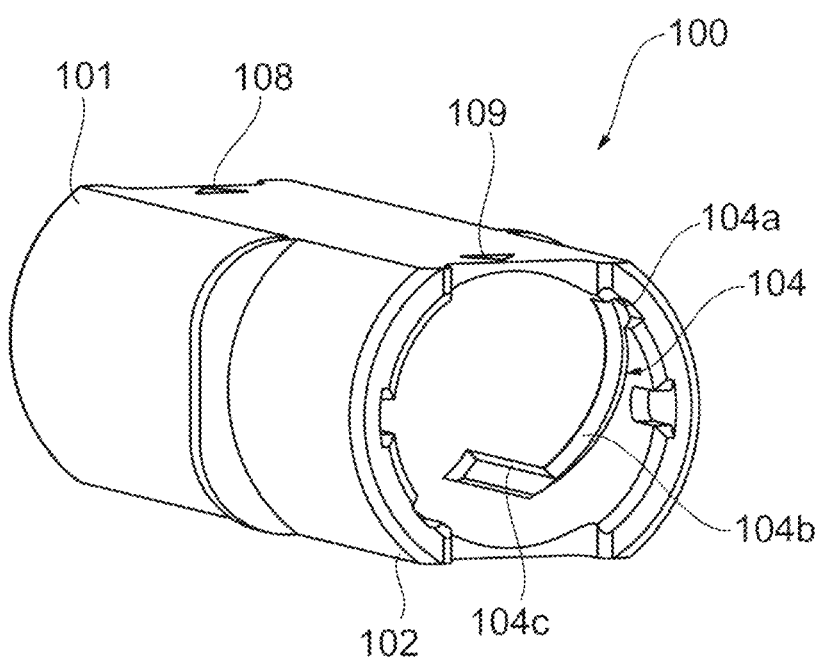
FIGS. 8C and 8D are perspective views of the adapter when seen from another angle.
Figure 8D:
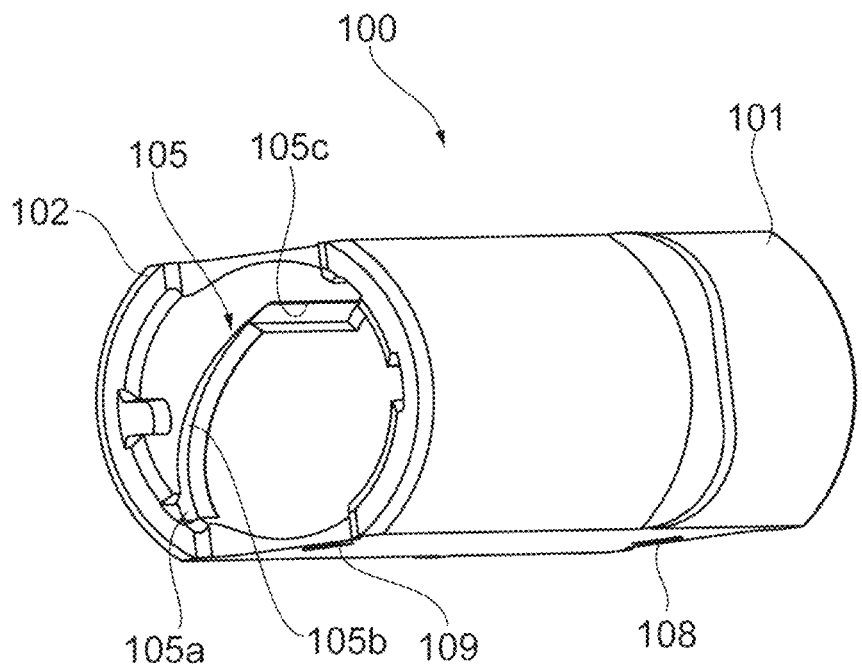
Figure 8E:
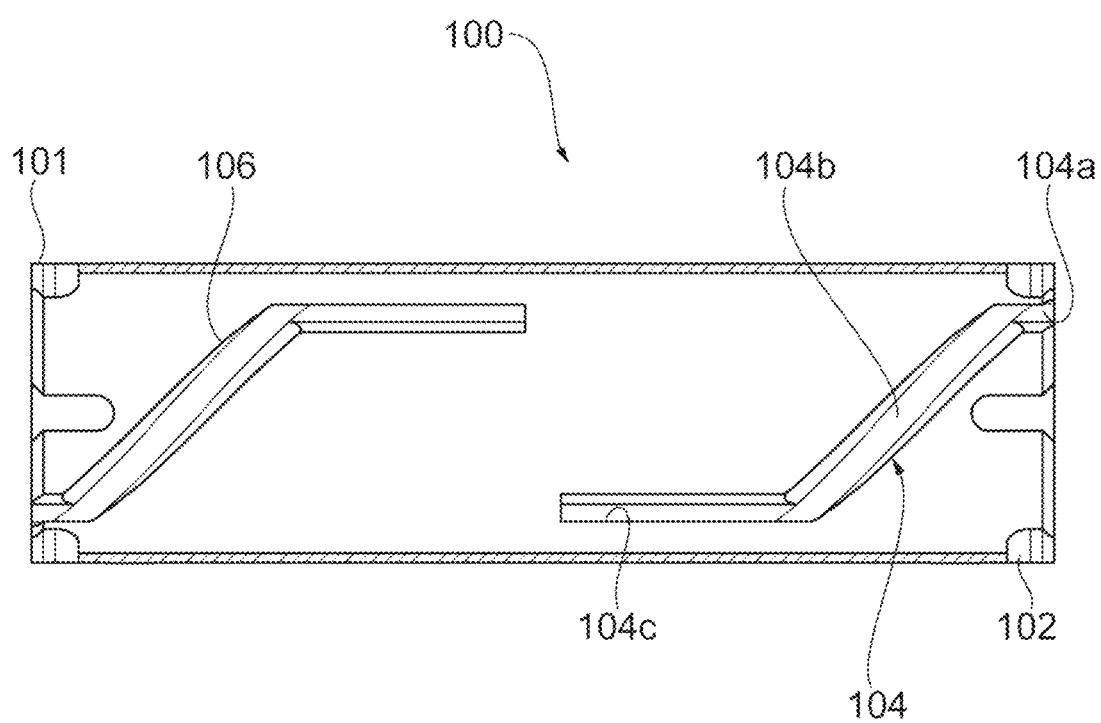
FIG. 8E is a longitudinal sectional view of the adapter.

A pair of guide grooves 104 and 105 which rotates the outer housing 50 of the optical connector 10 about a central axis G with respect to the inner housing 30 or the like by a predetermined angle (for example, 90 degrees) when the optical connector 10 is inserted into the adapter 100 are provided in the adapter 100. The pair of guide grooves 104 and 105 are configured to be point-symmetric about the central axis G. As illustrated in FIGS. 8C and 8E, the guide groove 104 includes a first straight portion 104a at a rear end thereof which is an insertion side of the optical connector 10, an inclined portion 104b which is connected to the first straight portion 104a and inclined along an inner peripheral surface thereof, and a second straight portion 104c which is connected to the inclined portion 104b and extends into the adapter 100 along the central axis G. The inclined portion 104b is inclined with respect to the central axis G. The other guide groove 105 also has a point-symmetric shape and includes a first straight portion 105a, an inclined portion 105b, and a second straight portion 105c, as illustrated in FIG. 8D. The guide protrusions 54a and 54b of the outer housing are respectively disposed in these guide grooves 104 and 105.

Figure 9:
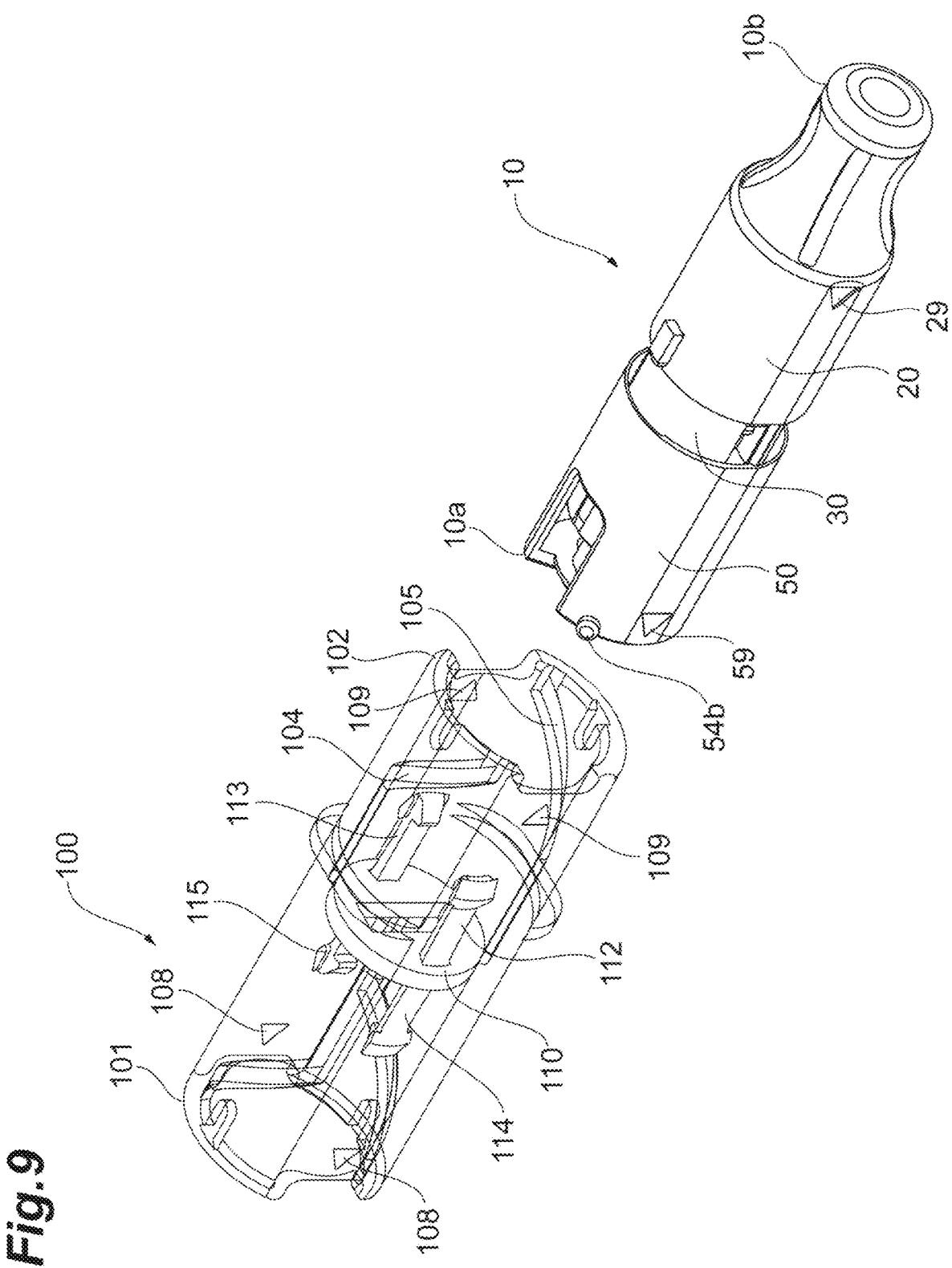
FIG. 9 is a perspective view showing an internal structure of the adapter in the optical connecting structure illustrated in FIG. 1.
Figure 10:
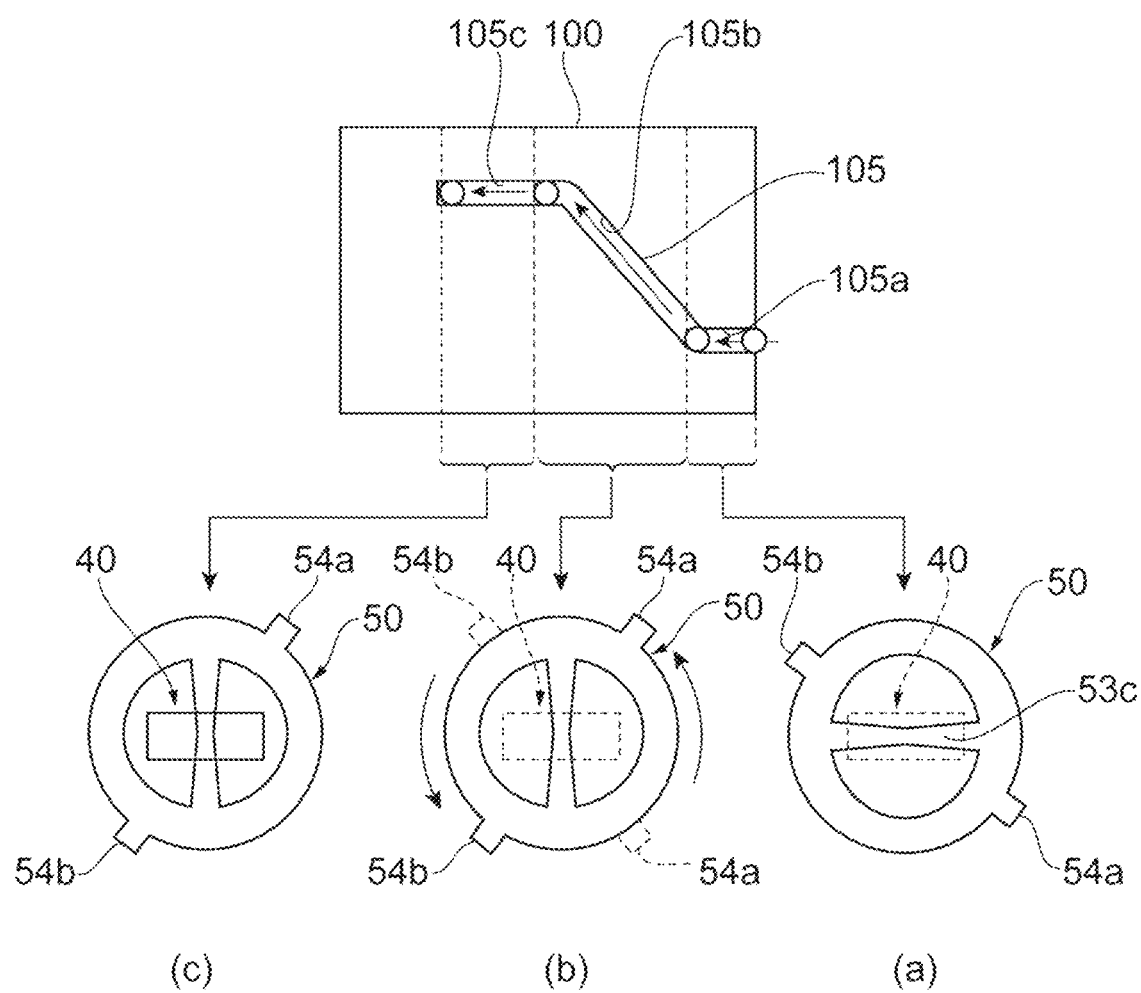
FIG. 10 is a diagram showing a relationship between a position of a guide protrusion of the outer housing in a guide groove formed in the adapter and a rotational position of the outer housing.
Figure 11A:
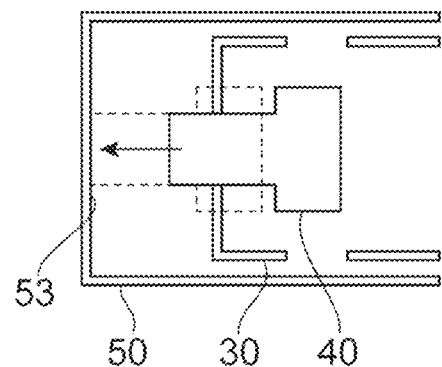
FIGS. 11A to 11C are schematic views sequentially showing a position of the ferrule when the optical connector is connected to the adapter.
Figure 11B:
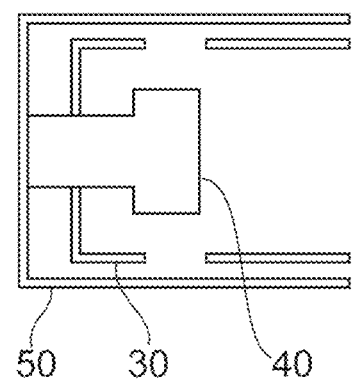
Figure 11C:
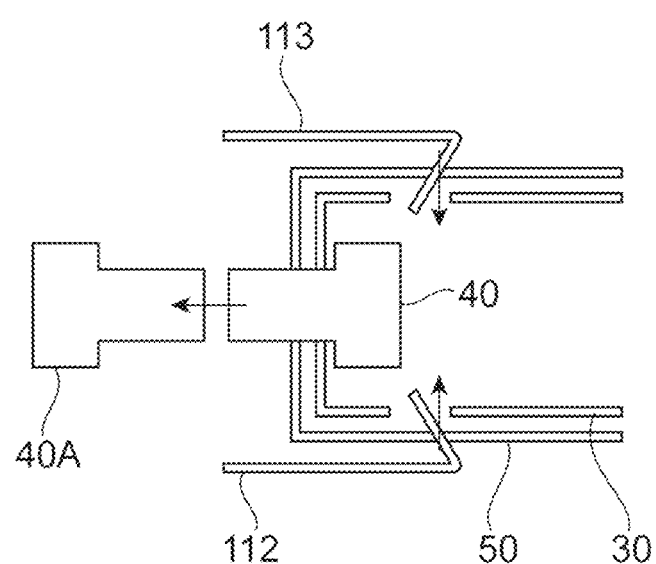

Here, the rotation operation of the outer housing 50 when the optical connector 10 is connected to the adapter 100 will be described with reference to FIGS. 9, 10 and 11A to 11C. FIG. 9 is a perspective view showing an internal structure of the adapter 100 in the optical connecting structure 1. FIG. 10 is a view showing a relationship between a position of the guide protrusion 54a of the outer housing 50 in the guide groove 105 of the adapter 100 and a rotational position of the outer housing 50. FIGS. 11A to 11C are schematic views sequentially showing a position of the MT ferrule 40 when the optical connector 10 is connected to the adapter 100, FIG. 11A is a view showing the position of the MT ferrule 40 when the guide protrusions 54b and 54a are in the first straight portions 104a and 105a of the guide grooves 104 and 105, FIG. 11B is a view showing the position of the MT ferrule 40 when the guide protrusions 54b and 54a are in the inclined portions 104b and 105b of the guide grooves 104 and 105, and FIG. 11C is a view showing the position of the MT ferrule 40 when the guide protrusions 54b and 54a are in the second straight portions 104c and 105c of the guide grooves 104 and 105.

As illustrated in FIG. 9, when the optical connector 10 moves forward along the central axis G to connect the optical connector 10 to the adapter 100, the guide protrusions 54b and 54a of the outer housing 50 are respectively inserted into the first straight portions 104a and 105a of the corresponding guide grooves 104 and 105 (refer to (a) portion of FIG. 10 and FIG. 11A).

Subsequently, when the optical connector 10 is further pushed forward in this state, the guide protrusions 54b and 54a move in the inclined portions 104b and 105b of the guide grooves 104 and 105 in an inner circumferential direction, and the outer housing 50 rotates about the central axis G with respect to the inner housing 30 or the like according to this movement in the inclined direction (movement in a spiral) (refer to (b) portion of FIG. 10 and FIG. 11B). During this rotation operation, the distal ends of the optical fibers held by the MT ferrule 40 is cleaned by the cleaner 53 disposed on the back surface of the connecting portion 52c of the outer housing 50.

Subsequently, when the guide protrusions 54b and 54a move to distal ends of the inclined portions 104b and 105b in the adapter 100, the guide protrusions 54b and 54a move to distal ends of the second straight portions 104c and 105c (refer to (c) portion of FIG. 10 and FIG. 11C). With this movement, the rear housing 20 or the inner housing 30 moves linearly further forward along the central axis G with respect to the outer housing 50, thus the front portion of the MT ferrule 40 protrudes from the opening regions 52a and 52b of the outer housing 50, and the MT ferrule 40 is in a state in which it can be connected to the MT ferrule of the other optical connector 40A. At this time, the inner housing 30 of the optical connector 10 is engaged and locked by the latches 112 and 113 of the latch member 110 installed in the adapter 100.

Figure 12A:
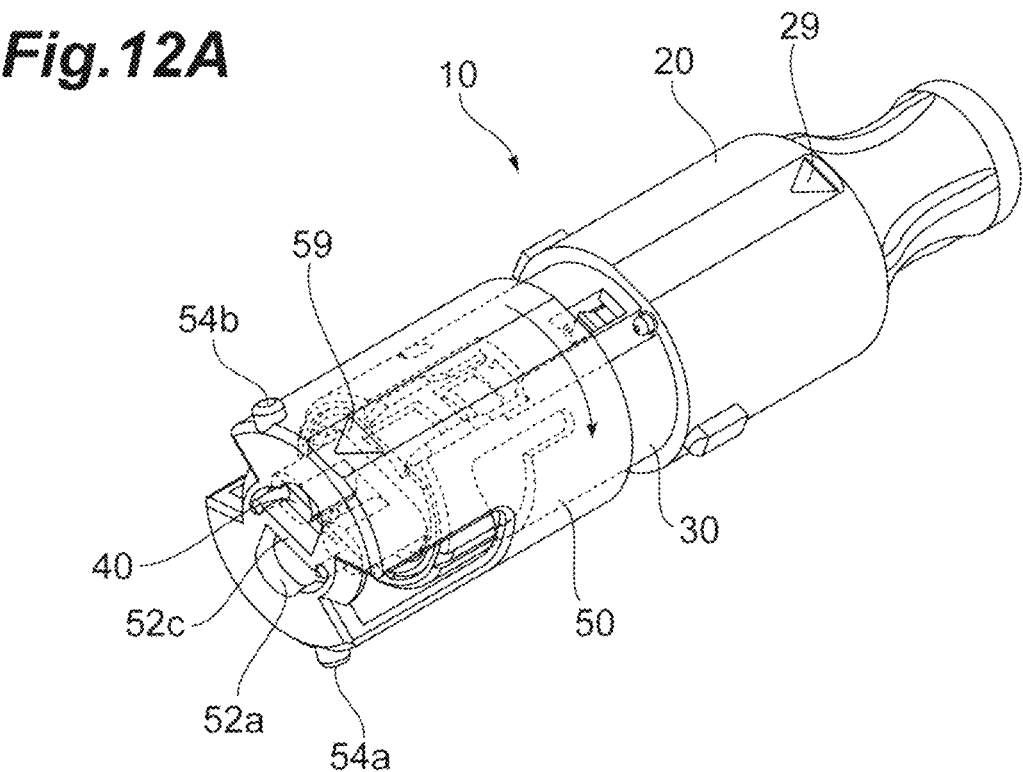
FIG. 12A is a perspective view showing the optical connector at an initial position.
Figure 12B:
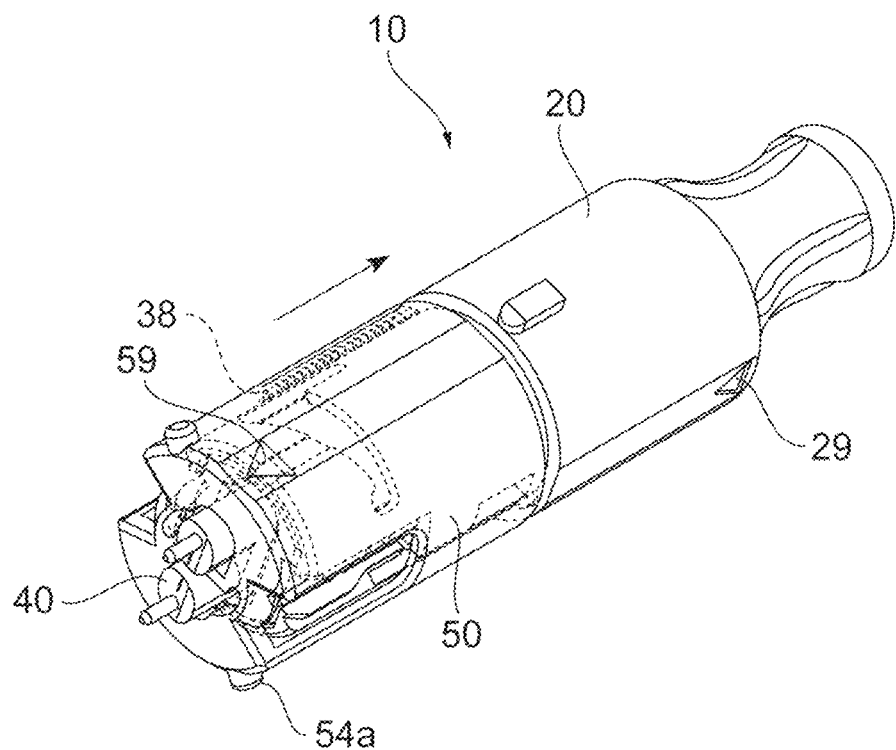
FIG. 12B is a perspective view showing an optical connector at a connected position.
Figure 13A:
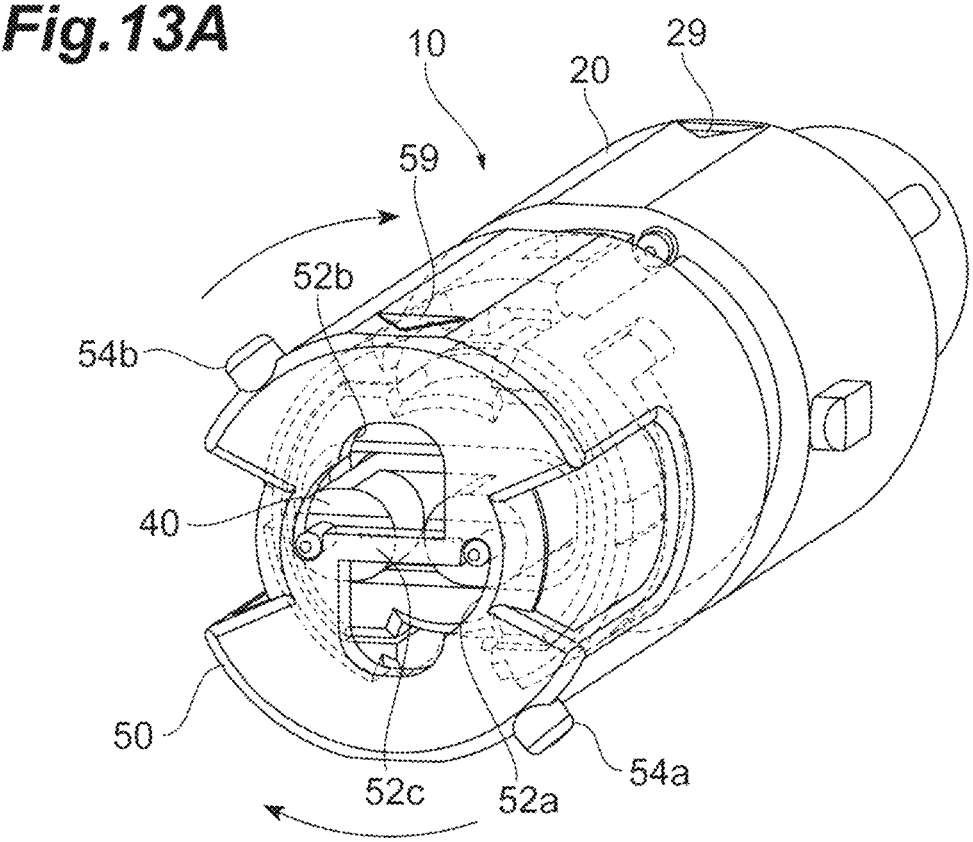
FIG. 13A is a perspective view of the optical connector seen from the front side when the optical connector is in the initial position.
Figure 13B:
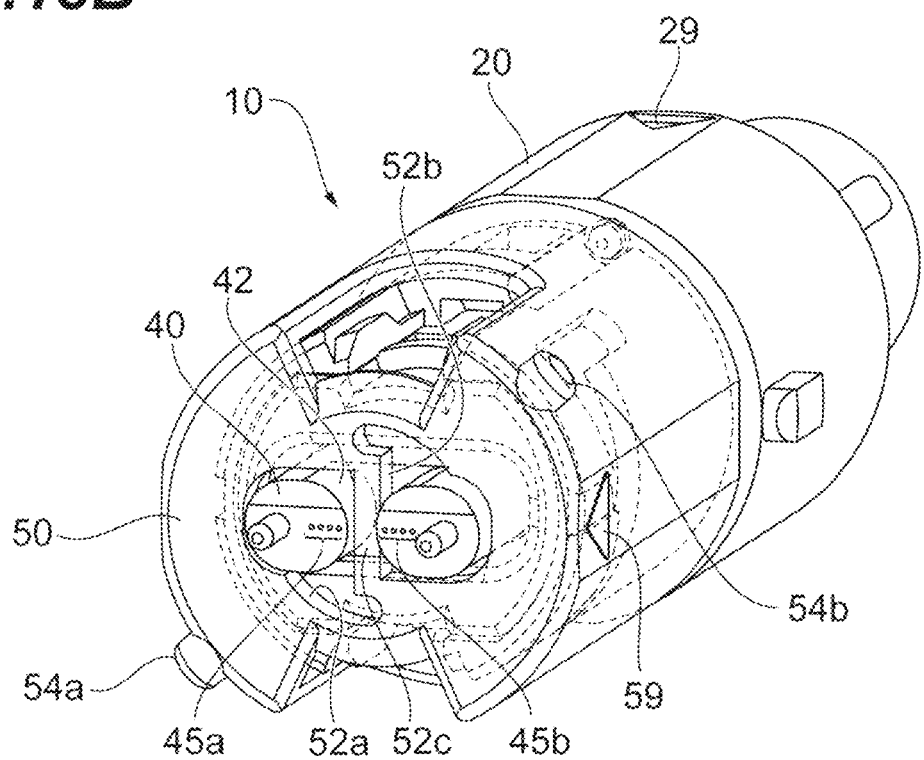
FIG. 13B is a perspective view of the optical connector seen from the front side when the optical connector is in the connected position.

With such an operation, the optical connector 10 is rotated from the initial position (refer to FIG. 12A and FIG. 13A) in which the fiber exposed surface (the openings 45a and 45b) of the MT ferrule 40 is covered by the connecting portion 52c and the cleaner 53, to the connected position (refer to FIG. 12B and FIG. 13B) which the fiber exposed surface of the MT ferrule 40 has been cleaned by the cleaner 53 and protrudes from the opening regions 52a and 52b of the outer housing 50 to be in a connectable state. FIG. 12A is a perspective view showing the optical connector in the initial position, and FIG. 12B is a perspective view showing the optical connector in the connected position after rotation. FIG. 13A is a perspective view of the optical connector seen from the front when the optical connector is in the initial position, and FIG. 13B is a perspective view of the optical connector seen from the front when the optical connector is in the connected position after rotation. With such a rotation operation, the opening regions 52a and 52b of the outer housing 50 are aligned with the exposed surface of the optical fiber of the MT ferrule 40, and the connecting portion 52c is accommodated in the recess 42 of the MT ferrule 40. When the optical connector 10 is removed from the adapter 100, the respective members are returned to the initial position by the MT spring 80 of the optical connector 10.

The optical connector 10 (the rear housing 20, the inner housing 30, and the outer housing 50) may be provided with a pair of arrows 29, a pair of arrows 39, and a pair of arrows 49, as illustrated in FIGS. 3 and 9, and the adapter 100 may be provided with a pairs of arrows 108 and a pair of arrows 109, as illustrated in FIGS. 8A, 8C and 8D and FIG. 9. The pair of arrows 109 corresponds to the arrows 29, the arrows 39 and the arrows 59. Thereby, a positioning of the optical connector 10 can be achieved by appearance when connecting the optical connector 10 to the adapter 100. The pair of arrows 29 are provided on an outer surface of the rear housing 20 at positions of point symmetry with respect to the center axis G or rotational symmetry about the center axis G, as illustrated in FIGS. 4A and 4B. The pair of arrows 39 are provided on the outer surface of the inner housing 30 at positions of point symmetry with respect to the center axis G or rotational symmetry about the center axis G, as illustrated in FIGS. 5A and 5B. The pair of arrows 59 are provided on the outer surface of the outer housing 50 at positions of point symmetry with respect to the center axis G or rotational symmetry about the center axis G, as illustrated in FIGS. 7A to 7C. The pair of arrows 108 are provided on the outer surface of the adapter 100 at positions of point symmetry with respect to the center axis G or rotational symmetry about the center axis G, and the pair of arrows 109 are provided on the outer surface of the adapter 100 at positions of point symmetry with respect to the center axis G or rotational symmetry about the center axis G. This positioning provides a secure positioning in the rotating direction of the optical connector 10 with respect to the adapter 100 or other optical connector to be connected. The pair of arrows 108 are used for positioning the other optical connector with respect to the adapter 100. FIG. 9 shows one example where the optical connector 10 is attached to the adapter 100 for connecting the optical connector 10 to the other optical connector. As illustrated in FIG. 9, when the optical connector 10 is connected to the adapter 100, the arrows 29 and 59 are aligned with the arrows 109 so that the protrusions 54b and 54a are easily inserted into the guide groves 104 and 105, respectively.

The pair of arrows 29, the pair of arrows 39, and the pair of arrows 59, and the two pair of arrows 108 and 109 may be colored-coded each other. For example, one of the pair of arrows 29, one of the pair of arrows 39, one of the pair of arrows 59, and one of the pair arrows 109 may be orange color, and the other of the pair of arrows 29, the other of the pair of arrows 39, the other of the pair of arrows 59, and the other of the pair of arrows 109 may be blue color. Thereby, an user can confirm a connecting direction of the optical connector 10 with respect to the adapter 100, which is a rotational angle of zero (0) degree or 180 degrees, after connecting the optical connector 10 to the adapter 100. The pair of arrows 108 of the adapter 100 may be colored-coded. When the above arrows are colored-coded each other, these arrows can be used to flip fiber polarity of two adjoining connectors simply by turning the connector upside down in alignment of the arrows. The arrows 29, 39, 59, 108, and 109 on the connector and the adapter may be replaced to shapes of squares, lines, circles, or the like, as indicators.

Figure 14:
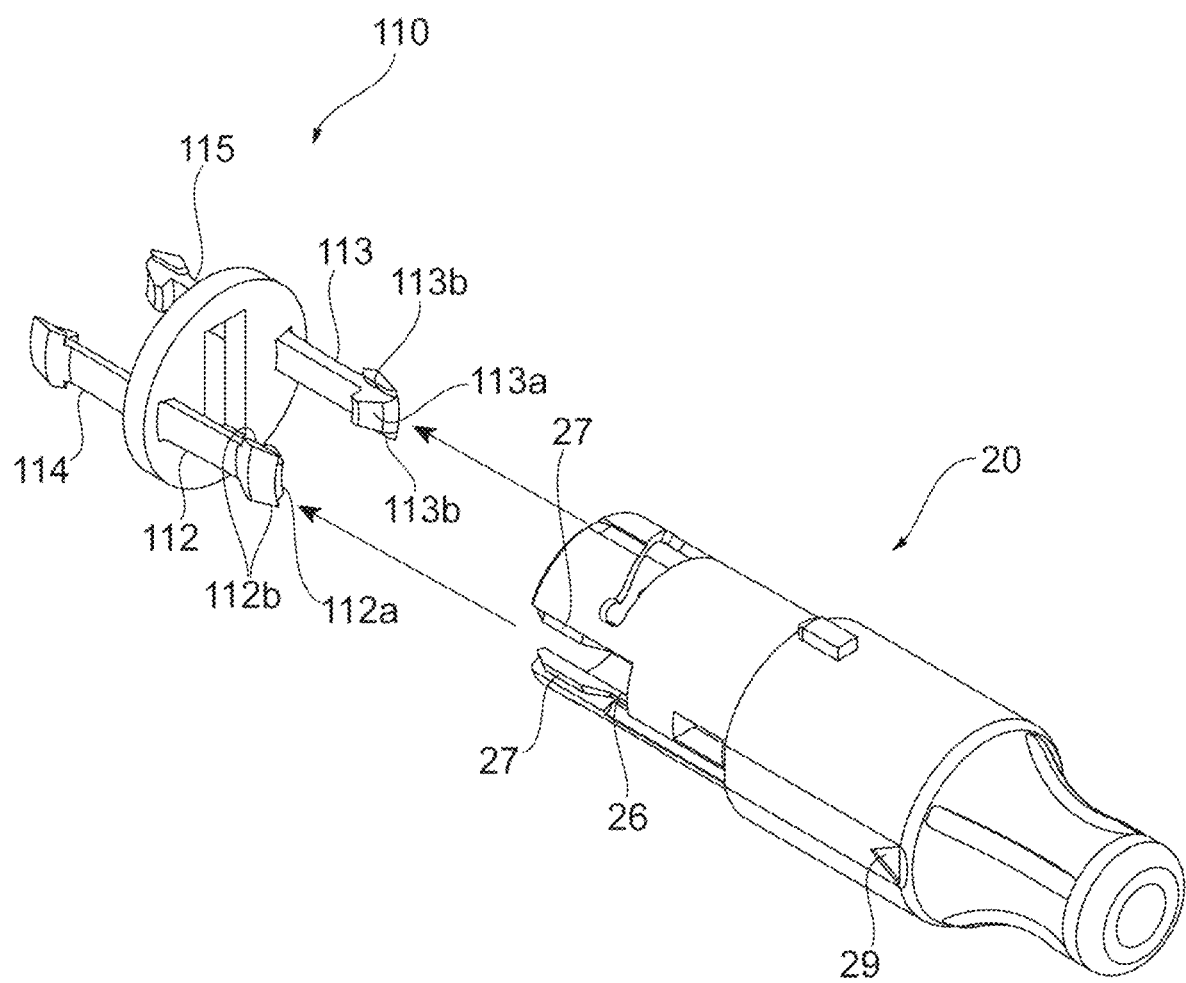
FIG. 14 is a view showing an engagement position relationship between a latch member disposed in the adapter and the rear housing of the optical connector.
Figure 15:
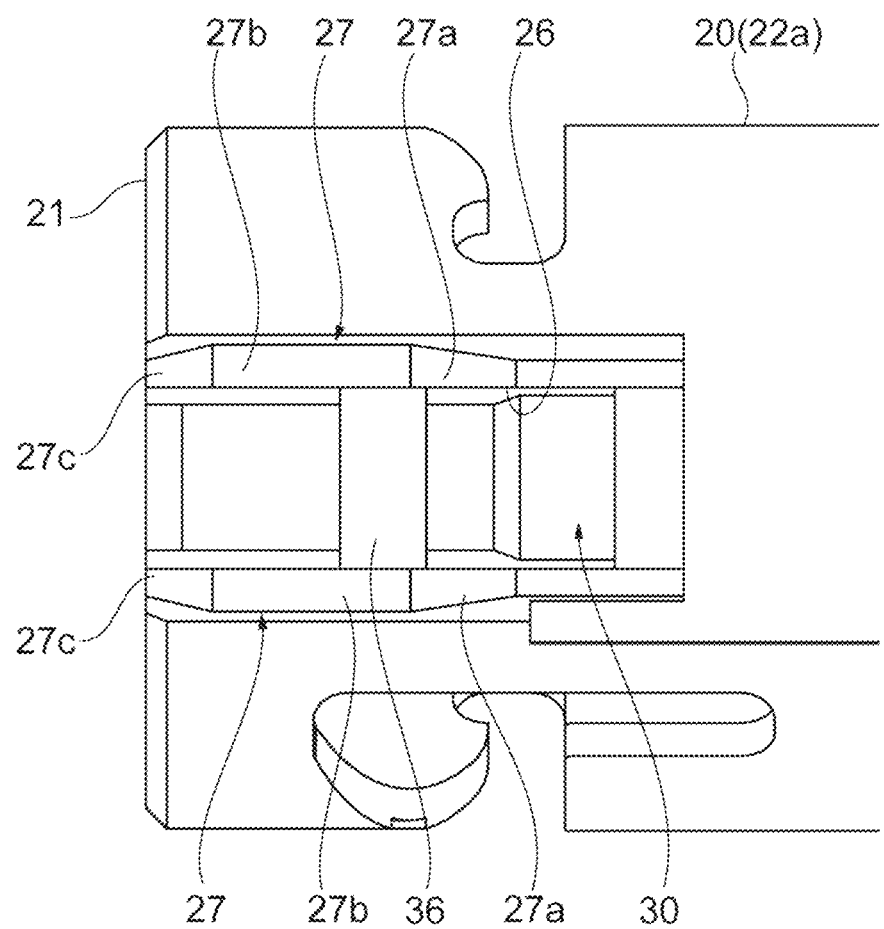
FIG. 15 is an enlarged top view showing a region which is a distal end of each of the outer housing and the inner housing and in which the latch member is engaged.

Next, as described above, a mechanism in which the optical connector 10 is engaged and released by the latch member 110 in the adapter 100 when the optical connector 10 is inserted into the adapter 100 will be described with reference to FIGS. 14 and 15. FIG. 14 is a view showing an engagement position relationship between the latch member 110 disposed in the adapter 100 and the rear housing 20 of the optical connector 10. FIG. 15 is an enlarged top view showing a region which is the distal end of each of the rear housing 20 and the inner housing 30 and in which the latch member 110 is engaged.

As illustrated in FIG. 14, the latch member 110 includes a disk portion 111, latches 112 and 113 which extend rearward from both edges of the disk portion 111, latches 114 and 115 which extend forward from both edges of the disk portion 111. The disk portion 111 has the same outer diameter as an inner diameter of the through hole 103 of the adapter 100 and is fixed at a predetermined position inside the adapter 100 (refer to FIG. 8B and FIG. 9). The latches 112 and 113 are members for fixing the optical connector 10 to the adapter 100, and the latches 114 and 115 are members for fixing another optical connector to the adapter 100. The latches 112 and 113 and the latches 114 and 115 have the same shape, and the configuration of the latches 112 and 113 will be described below, but the configuration of the latches 114 and 115 is also the same.

Figure 16:
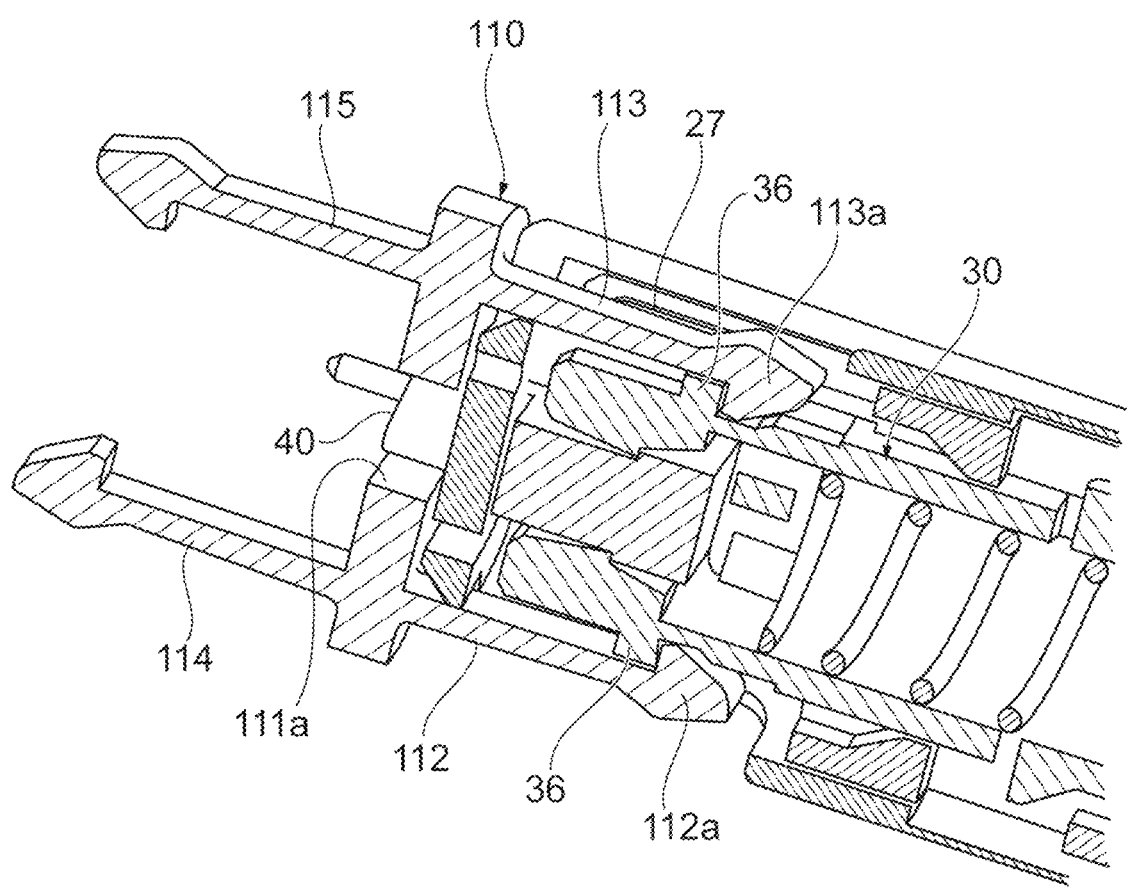
FIG. 16 is a perspective cross-sectional view showing a state in which the latch member is engaged with the inner housing.

Hook portions 112a and 113a are provided at rear distal ends of the latches 112 and 113, and release portions 112b and 113b are provided on both edges of each of the hook portions 112a and 113a. The hook portions 112a and 113a are configurations which are engaged with the latch step 36 (refer to FIG. 15) of the inner housing 30 located in an opening 26 of the rear housing 20 and fix the optical connector 10 to the adapter 100 when the optical connector 10 is inserted into the adapter 100. FIG. 16 shows a state in which the hook portions 112a and 113a of the latches 112 and 113 of the latch member 110 are engaged with the latch steps 36 of the inner housing 30 in this way. When the optical connector 10 is engaged with the latch member 110, the exposed surfaces 43a and 43b of the MT ferrule 40 are located in an opening portion 111a of the disk portion 111 of the latch member 110. Thus, the optical connector can be optically coupled to the counterpart optical connector.

Figure 17:
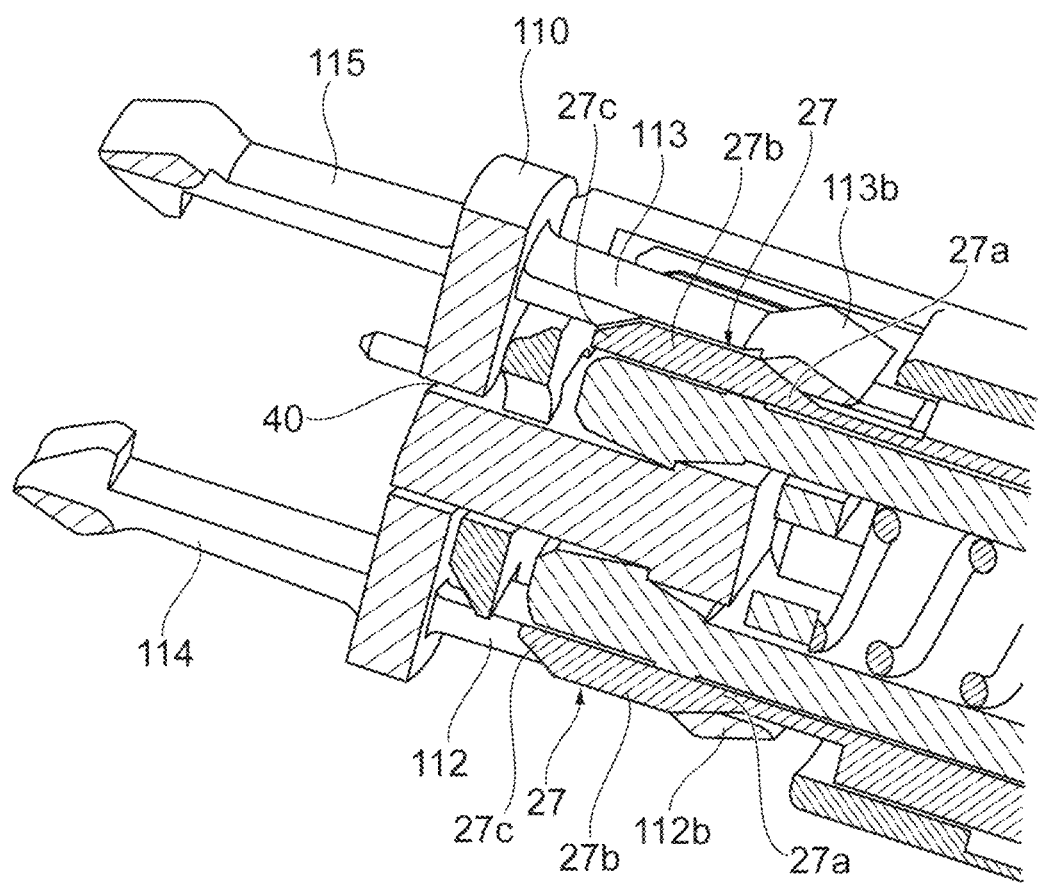
FIG. 17 is a perspective cross-sectional view showing a state in which the engagement state between the inner housing and the latch member is released by the rear housing.

On the other hand, when the optical connector 10 is removed from the adapter 100 after the latch member 110 is engaged with the inner housing 30, an operation in which the optical connector 10 is pulled out from the adapter 100 rearward is performed. That is, an operation in which the rear housing 20 is linearly moved rearward with respect to the latch member 110 is performed. At this time, as illustrated in FIG. 17, the release portions 112b and 113b provided on both edges of the hook portions 112a and 113a climb the first slope 27a of each of the protruding portions 27 located at both edges of the opening 26 of the rear housing 20 to reach the flat portion 27b and then come down along the second slope 27c. Accordingly, the hook portions 112a and 113a are lifted up outward, and the engagement with the latch step 36 is released.

Next, a method of connecting the optical connector 10 having the above-described configuration to another optical connector using the adapter 100 will be described. In this connecting method, as described above, first, the guide protrusions 54a and 54b which are one configuration of the rotation guiding mechanism provided on the outer housing 50 are aligned with entrances of the guide grooves 104 and 105 which are the other configuration of the rotation guiding mechanism provided on the adapter 100. Subsequently, the outer housing 50 is linearly moved toward the adapter 100 along the central axis G, and the linear movement of the outer housing 50 is converted into the rotational movement of the outer housing 50 by the guide protrusions 54a and 54b and the guide grooves 104 and 105 which are rotation guiding mechanisms provided in the outer housing 50 and the adapter 100. Thus, the outer housing 50 is rotated from the initial position to the connected position by a predetermined angle (for example, 90 degrees) about the central axis G. In the connecting method, when the rotation operation of the outer housing 50 is performed, the fiber exposed surface of the MT ferrule 40 is located in the opening regions 52a and 52b provided in the front wall 51 of the outer housing 50, and the fiber exposed surface of the MT ferrule 40 protrudes from the front wall 51 toward the inside of the adapter 100.

On the other hand, as a method of releasing the coupling of the optical connector 10 coupled to another optical connector via the adapter 100, the rear housing 20 or the outer housing 50 is pulled out from the adapter 100 rearward. Additionally, the outer housing 50 is rotated from the connected position to the initial position by operating the above-described rotation guiding mechanisms in a reverse direction. Thus, the MT ferrule 40 returns to the initial position.

As described above, in the optical connector 10 according to the embodiment, when the outer housing 50 is rotated from the initial position to the connected position (the rotated position) with respect to the inner housing 30 by the rotation guiding mechanisms including the guide protrusions 54a and 54b and the guide grooves 104 and 105, the opening regions 52a and 52b of the front wall 51 of the outer housing 50 move to positions corresponding to the fiber exposed surfaces of the MT ferrule 40. Since the distal end of the MT ferrule 40, that is, the distal ends of the optical fibers held by the MT ferrule 40 is exposed to the outside (since it is protected until then) when the optical connector 10 is rotated from the initial position to the connected position to connect the optical connector 10 to another connector, according to the optical connector 10, it is possible to curb the adhesion of dust to the end surfaces of the optical fibers. Further, since the outer housing 50 is rotated using the above-described rotation guiding mechanisms, an operation thereof is easy.

The optical connector 10 has guide protrusions 54a and 54b located on the outer surface of the outer housing 50 as the rotation guiding mechanism. Additionally, the outer housing 50 rotates between the initial position and the connected position with respect to the inner housing 30 by the guide protrusions 54a and 54b moving in the guide grooves 104 and 105 provided in the inner peripheral wall of the adapter 100. Therefore, according to such an optical connector 10, the rotation guiding mechanism having a simple structure can be provided. Further, the guide protrusions 54a and 54b are disposed adjacent to the front end 10a of the optical connector 10. Since the guide protrusions 54a and 54b are disposed adjacent to the front end 10a of the optical connector 10, the rotation angle of the outer housing 50 can be increased even when the optical connector 10 is a small connector.

The pair of guide protrusions 54a and 54b and the guide grooves 104 and 105 are formed to be point-symmetric with respect to the central axis G. Thus, the outer housing 50 can be smoothly rotated by the guide protrusions 54a and 54b and the guide grooves 104 and 105.

In the optical connector 10, the outer housing 50 includes the cleaner 53 for cleaning the distal ends of the optical fibers inside the front wall 51. In the case in which the optical connector 10 is rotated from the initial position to the connected position when the optical connector 10 is connected to another connector, the distal end of the MT ferrule 40 can be cleaned by the cleaner 53. The cleaner 53 may be wound around the front wall 51 through the opening regions 52a and 52b.

The optical connector 10 includes the MT ferrule 40 which accommodates the distal end portions of the optical fibers accommodated in the optical fiber cable C, and the MT ferrule 40 has the recess 42 at the center of the front end thereof. For example, when the optical connector is downsized, in the case of the ferrule of the related art, the rotation of the outer housing may be hindered. However, downsizing of the optical connector 10 is easily achieved by employing the configuration of the ferrule with a central portion removed, which may otherwise hinder the rotation, as in the embodiment.

Second Embodiment

Figure 18A:
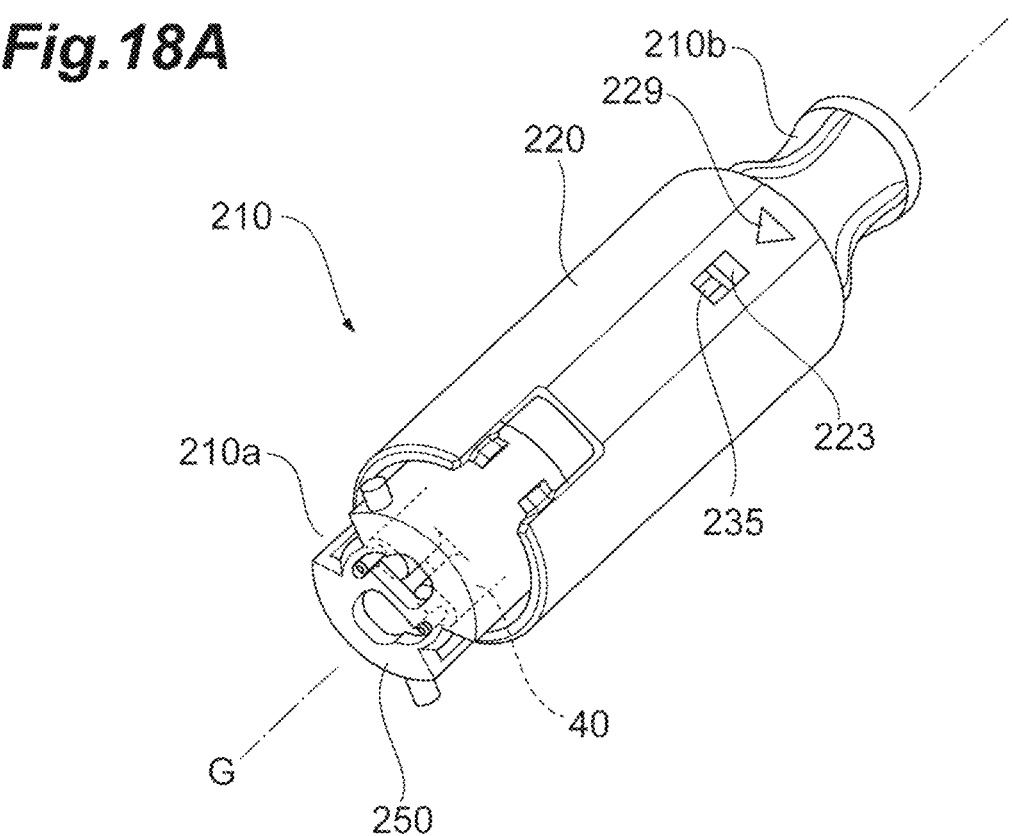
FIG. 18A is a perspective view of the optical connector according to a second embodiment when the optical connector is in the initial position.
Figure 18B:
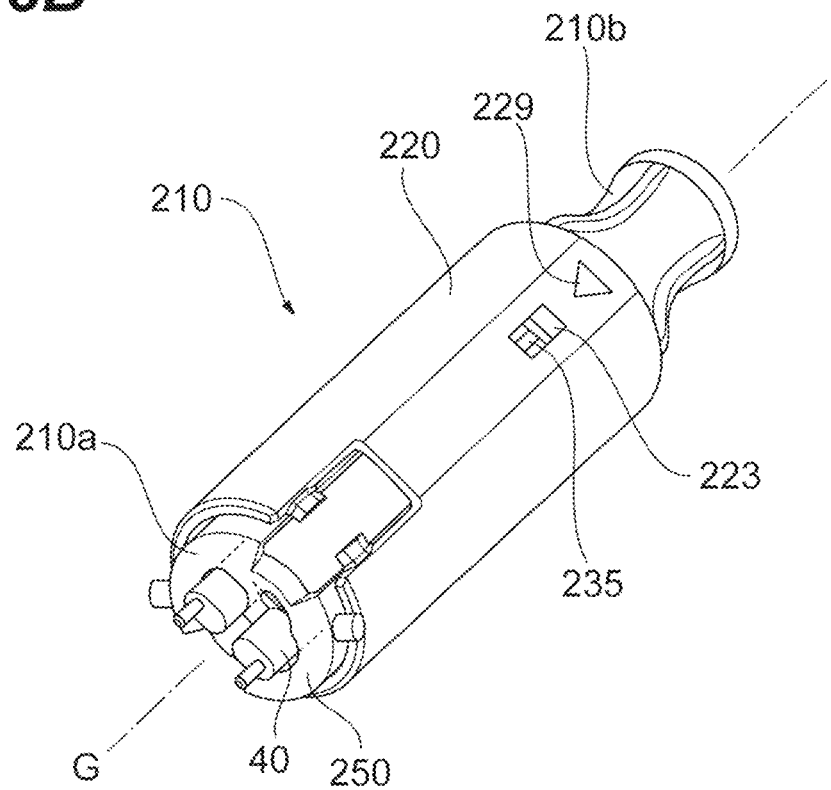
FIG. 18B is a perspective view of the optical connector when the optical connector is in the connected position.
Figure 19:
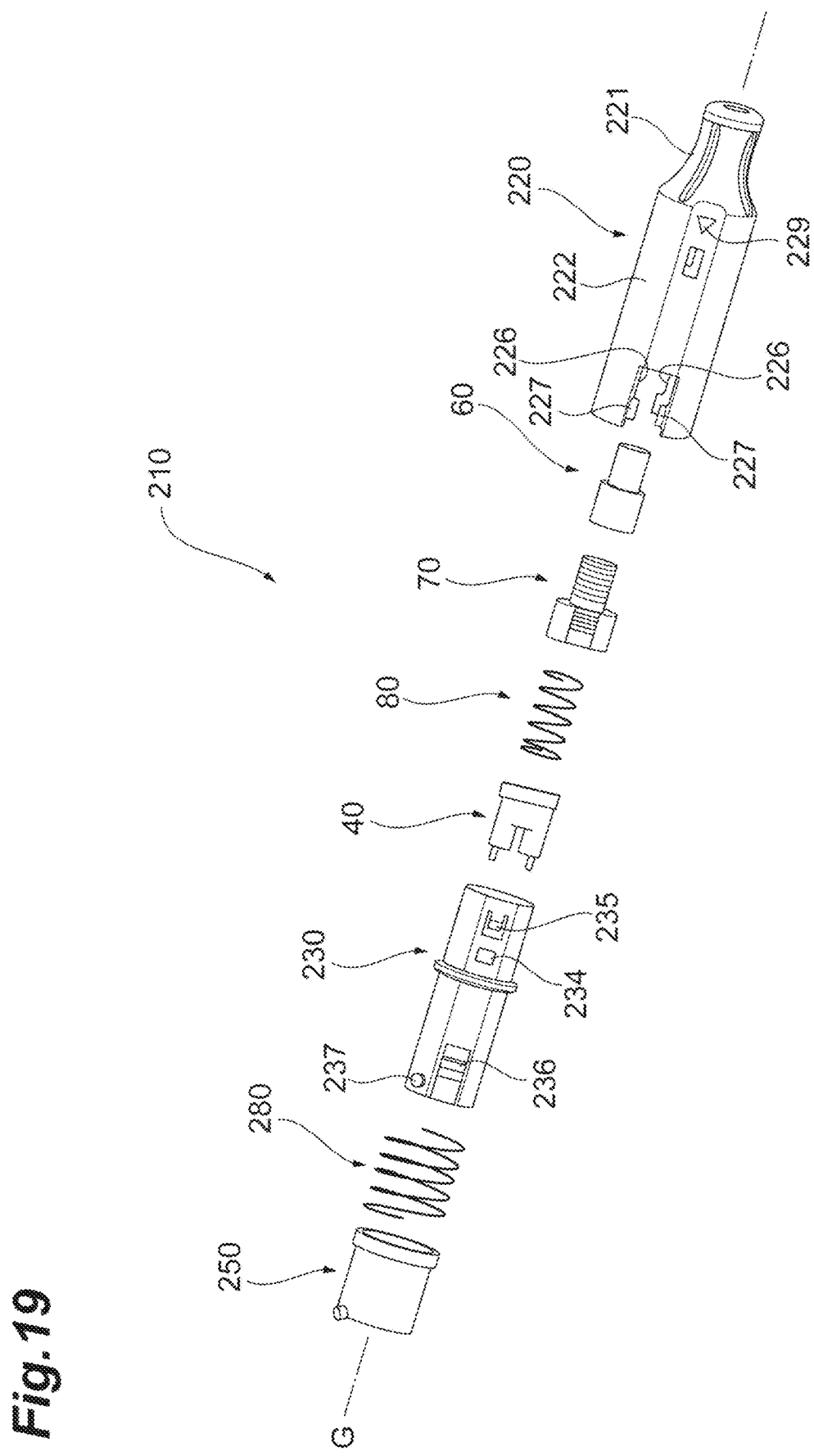
FIG. 19 is an exploded perspective view of the optical connector illustrated in FIGS. 18A and 18B.

Referring now to FIGS. 18A and 18B and FIG. 19, an optical connector 210 according to a second embodiment will be described. FIG. 18A is a perspective view of the optical connector according to a second embodiment when the optical connector is in the initial position, and FIG. 18B is a perspective view of the optical connector when the optical connector is in the connected position. FIG. 19 is an exploded perspective view of the optical connector illustrated in FIGS. 18A and 18B. As illustrated in FIGS. 18A and 18B, the optical connector 210 is a connector to modify part of the configuration of the optical connector 10 according to the first embodiment, and is a substantially cylindrical member which extends along a central axis G extending from a front end 210a toward a rear end 210b. In the optical connector 210, a rear portion of the outer housing 250 is accommodated inside the rear housing 220. In the following description, different points from the optical connector 10 will be mainly described and description of the similar portions may be omitted.

As illustrated in FIG. 19, the optical connector 210 includes a rear housing 220, an inner housing 230, an MT ferrule 40, an outer housing 250, a caulking ring 60, an MT rear 70, and an MT spring 80. In the optical connector 210, the inner housing 230, the MT ferrule 40, the caulking ring 60, the MT rear 70, and the MT spring 80 are accommodated inside the rear housing 220 and the outer housing 250. The basic configurations and functions of the rear housing 220, the inner housing 230, and the outer housing 250 are the same as the configurations and the functions of the rear housing 20, the inner housing 30, and the outer housing 50 of the optical connector 10, respectively. The optical connector 210 further includes a spring 280 located between the inner housing 230 and the outer housing 250, instead of the pair of spacing springs 38 according to the first embodiment (refer to FIG. 12B). The spring 280 is configured to press the outer housing 250 toward the front end 210a so as to smoothly return the optical connector 210 from the connected position (refer to FIG. 18B) to the initial position (refer to FIG. 18A). When the spring 280 presses the outer housing 250, the outer housing 250 rotates about the central axis G with respect to the rear housing 220.

Figure 20A:
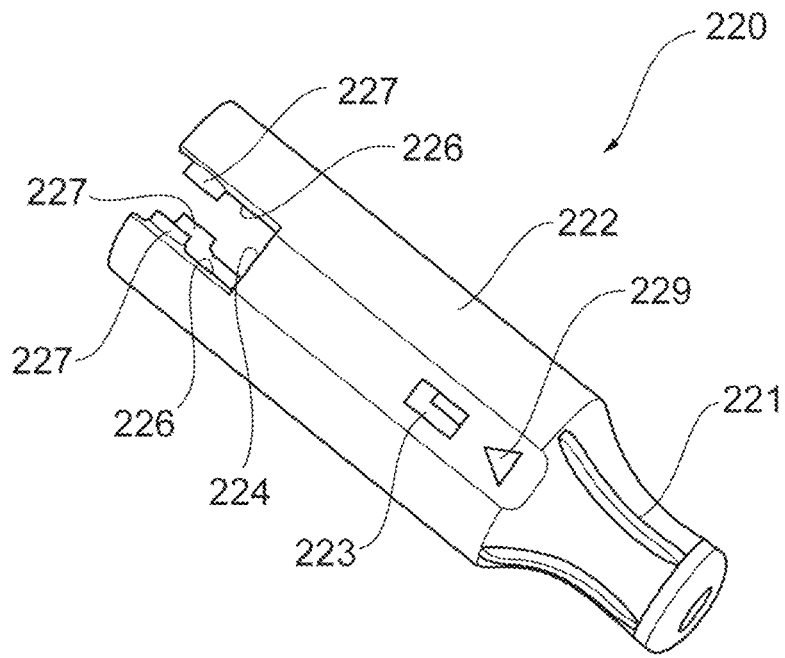
FIG. 20A is a perspective view of a rear housing of the optical connector illustrated in FIGS. 18A and 18B.

The rear housing 220 is disposed adjacent to the rear end 210b of the optical connector 210 and inserts the optical fiber cable therethrough. FIG. 20A is a perspective view of the rear housing 220. As illustrated in FIG. 20A, the rear housing 220 includes a boot portion 221 having an inner hole into which the optical fiber cable or the optical fiber(s) is inserted, and a housing portion 222 formed in communication with the boot portion 221. The housing portion 222 may have a D-shaped cut so as to prevent the optical connector 210 from unintentionally rotating when inserting the optical connector 210 into the adapter 300 (refer to FIG. 23). Since the outer housing 250 is located inside the rear housing 220, the rear housing 220 does not have a smaller portion corresponding to the first portion 22a according to the first embodiment and an outer shape of the housing portion 222 is substantially cylindrical.

The rear housing 220 has a pair of openings 223, which are provided at point-symmetric positions about the central axis G, as same as the first embodiment. However, the pair of openings 223 are located closer to the boot portion 221 than the openings 23 of the first embodiment. When the inner housing 230 is inserted and disposed in a through hole 224 of the rear housing 220, a pair of protrusions 235 of the inner housing 230 are respectively engaged with the pair of openings 223, and thus the inner housing 230 is positioned with respect to the rear housing 220. Since each of the openings 223 has a predetermined length along the central axis G, the inner housing 230 can move a predetermined distance along the central axis G with respect to the rear housing 220.

The rear housing 220 does not include portions corresponding to a pair of guide openings 25 according to the first embodiment. A function of the pair of guide openings 25 is provided with an inner surface of the outer housing 250, which will be described later. On the other hand, the rear housing 220 includes a pair of cutouts 226 provided in front of the central axis G of the pair of openings 223. Each of the cutouts 226 is provided point-symmetrically with respect to the central axis G and is formed to extend along the central axis G. A pair of projecting portions 227 which extend along the central axis G are provided on both edges of each of the cutouts 226, same as the first embodiment. The pair of projecting portions 227 are thin plate-shaped portions which extend along the central axis G and have a trapezoidal shape in a side view. Each of the projecting portions 227 has a first slope 227a, a flat portion 227b, and a second slope 227c (refer FIG. 25B). When the optical connector 210 is inserted and locked into the adapter 300, latches 312 and 313 of a latch member 310 are respectively located in the cutouts 226, and the latches 312 and 313 are engaged with latch steps 336 of the inner housing 330 corresponding to the cutouts 226. Thus, the optical connector 210 is connected to the adapter 300. The pair of projecting portions 227 are used when the latch engagement is released. Details will be described later. A pair of arrows 229 may be provided with the rear housing 220 for aligning the optical connector 210 with the adapter 300 when connecting the optical connector 210 to the adapter 300. The pair of arrows 229 are provided on the outer surface of the rear housing 220 at positions of point symmetry with respect to the center axis G or rotational symmetry about the center axis G. The pair of arrows 229 may be colored-coded each other.

Figure 20B:
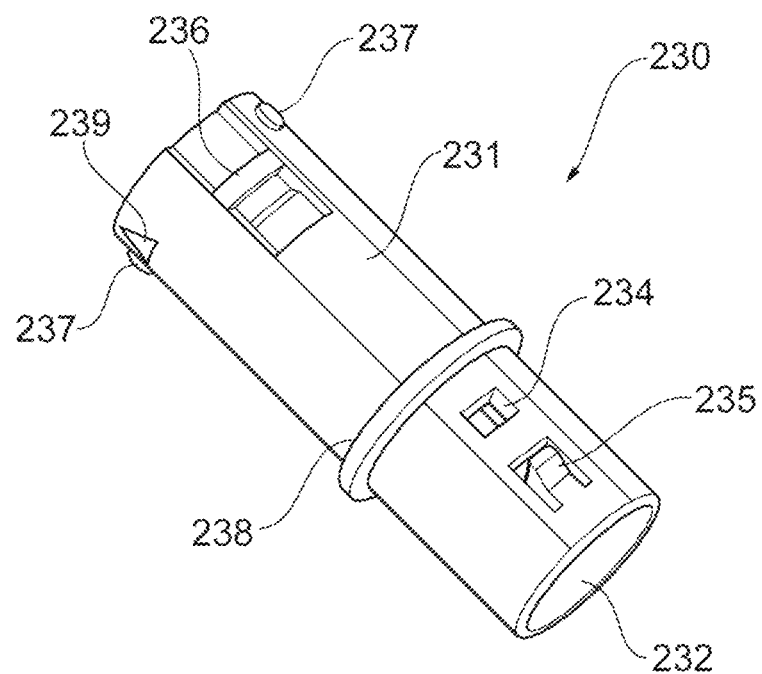
FIG. 20B is a perspective view of an inner housing of the optical connector illustrated in FIGS. 18A and 18B.

As illustrated in FIG. 19 and FIG. 20B, the inner housing 230 has a substantially elliptic cylindrical shape and has a pair of flat surfaces 231, as same as the first embodiment. FIG. 20B is a perspective view of the inner housing 230 of the optical connector 210. A through hole 232 which extends from a front end toward a rear end is provided in the inner housing 230. A step is provided in the vicinity of the front end of the through hole 232, and an opening region of the through hole 232 in front of the step is narrowed. With such a configuration, a front portion of the MT ferrule 40 inserted from the rear end of the inner housing 230 can protrude from the front end of the inner housing 230. The MT ferrule 240 is biased forward by the MT spring 80 disposed behind the MT ferrule 40. Further, the MT rear 70 for biasing the MT ferrule 40 forward by the MT spring 80 is inserted from a rear end of the through hole 232.

The pair of openings 234 and the pair of protrusions 235 are provided near the rear end of the inner housing 230. Although FIG. 20B disclose one opening 234 and one protrusion 235, another opening 234 and protrusion 235 disposed in a point symmetry with respect to the central axis G with respect to the central axis G also have the same configuration. Unlike the first embodiment, the openings 234 are located closer to the front end and the protrusions 235 are located closer to the rear end. A pair of protrusions 71 of the MT rear 70 are engaged with the pair of openings 234, respectively. Due to this engagement, the MT ferrule is accommodated in the inner housing 230. The pair of protrusions 235 are disposed in the pair of openings 223 of the rear housing 220 in a slidable state. A pair of latch steps 236 are provided near the front end of the inner housing 230. The latch steps 236 are disposed in a point symmetry with respect to the central axis G and have the same configuration. When the optical connector 210 is connected to the adapter 300, the latches 312 and 313 of the latch member 310 disposed in the adapter 300 are engaged with the pair of latch steps 236, respectively. Thus, the optical connector 210 including the inner housing 230 is fixed to the adapter 300.

The inner housing 230 further includes a pair of protrusions 237 disposed near the front end of the inner housing 230, and a flange portion 238 disposed in middle of the inner housing 230. The pair of protrusion 237 are disposed in a point symmetry with respect to the central axis G or a rotational symmetry with respect to the central axis G. The flange portion 238 supports a back end of the spring 280, and provides a biasing force against the outer housing 250 using the spring 280. The pair of protrusion 237 are respectively located a pair of grooves 256 provided on the inner surface of the outer housing 250 (refer to FIG. 21), which will be described later. When the outer housing 250 rotates with respect to the inner housing 230, the pair of protrusions 237 move within the grooves 256 so as to guide the rotation of the outer housing 250. A pair of arrows 239 may be provided with the inner housing 220 for aligning the optical connector 210 with the adapter 300 when connecting the optical connector 210 to the adapter 300. The pair of arrows 239 are provided on the outer surface of the inner housing 220 at positions of point symmetry with respect to the center axis G or rotational symmetry about the center axis G. The pair of arrows 239 may be colored-coded each other.

Figure 21:
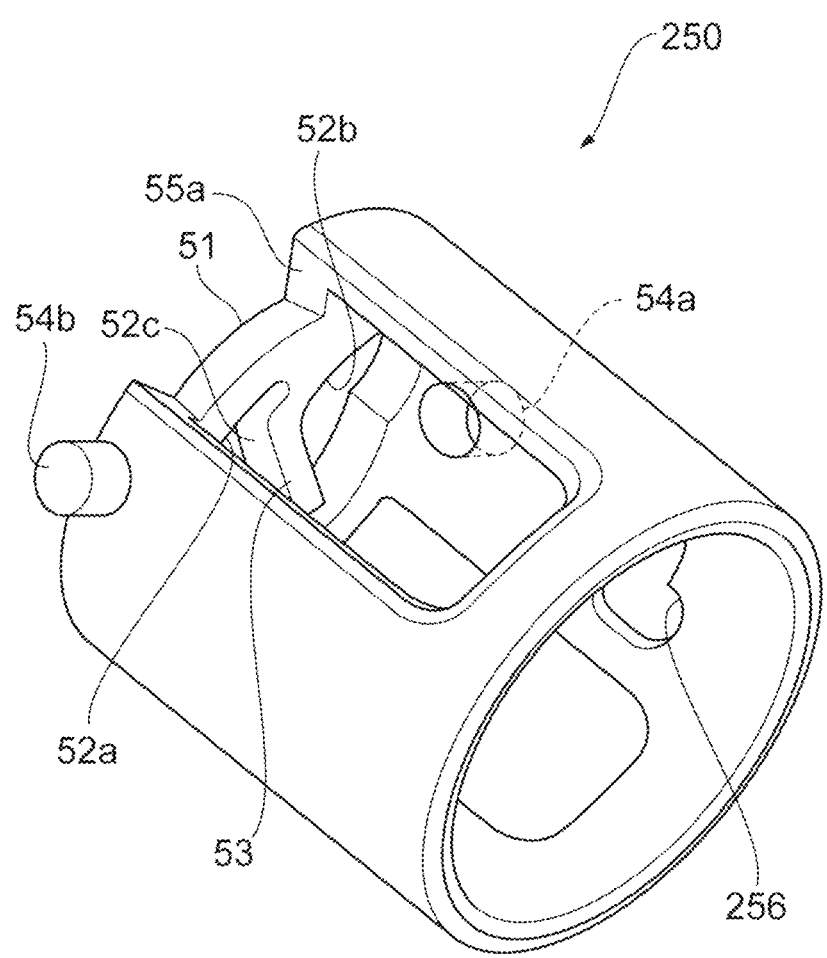
FIG. 21 is a perspective view of an outer housing of the optical connector illustrated in FIGS. 18A and 18B.

As illustrated in FIG. 19 and FIG. 21, the outer housing 250 is disposed to cover the outer periphery of the front portion of the inner housing 230 and has a front wall 51 which covers the fiber exposed surfaces 43a and 43b of the MT ferrule 40 (refer to FIG. 6A). FIG. 21 is a perspective view of the outer housing 250. As illustrated in FIG. 21, the outer housing 250 includes the front wall 51, opening regions 52a and 52b, a connecting portion 52c, a cleaner 53, a pair of guide protrusions 54a and 54b, opening portions 55a and 55b, and a pair of guide recesses 256a and 256b.

The pair of guide protrusions 54a and 54b of the outer housing 250 are inserted into guide grooves 304 and 305 provided in an inner peripheral surface of the adapter 300. The outer housing 250 rotates about the central axis G with respect to the rear housing 220 or the inner housing 230 by the pair of guide protrusions 54a and 54b moving forward along the central axis G in the guide grooves 304 and 305 of the adapter 300. Further, at this time, the outer housing 250 moves rearward along the central axis G with respect to the rear housing 220 or the inner housing 230. The rotation and the rearward linear movement are guided by the movement the protrusions 236 of the inner housing 230 inside the pair of guide recessed 256 of the outer housing 250.

The outer housing 250 has a pair of opening regions 52a and 52b in the front wall 51 at the front end, as same as the first embodiment. The connecting portion 52c is provided between the pair of opening regions 52a and 52b. The connecting portion 52c is configured to move to a position corresponding to the recess 42 of the MT ferrule 40 when the outer housing 250 is rotated to the connected position. On the other hand, a cleaner 53 for cleaning an end surface of the optical fiber is provided on a back surface of the connecting portion 52c (refer to FIG. 21) and covers the exposed surface of the optical fiber in a normal state. Additionally, in the case in which the optical connector 210 is connected to the adapter 300, when the outer housing 250 rotates with respect to the inner housing 230 or the like, the outer housing 250 moves in a direction (rearward) approaching the inner housing 230 or the like, and the exposed surfaces of the optical fibers exposed from the openings 45a and 45b are cleaned using the rotation operation of the outer housing 250.

The cleaner 53 is slightly separated from the exposed surfaces 43a and 43b at the front end of the MT ferrule 40 in the initial position. When the outer housing 250 rotates, the inner housing 30 slightly advances with respect to the outer housing 250, and a front end surface of the MT ferrule 40 is in close contact with the cleaner 53 by this advance. After that, when the outer housing 250 rotates continuously, the exposed surfaces 43a and 43b of the MT ferrule 40 in which the exposed surfaces 43a and 43b are in close contact with the cleaner 53 move toward the opening regions 52a and 52b of the outer housing 250, and the front end surface of the MT ferrule 40 is cleaned by the cleaner 53 by the rotation operation at that time. With this cleaning, a decrease in connection loss due to attached dust or the like is curbed when an optical connection is performed using the optical connector 210.

Figure 22A:
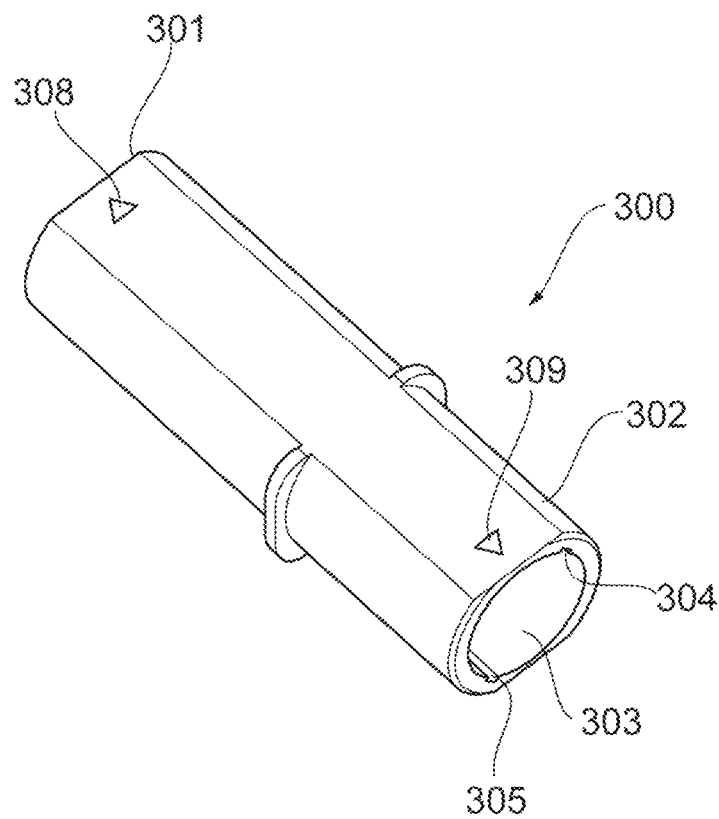
FIG. 22A is a perspective view of an adapter used for connecting the optical connector according to the second embodiment to another optical connector.
Figure 22B:
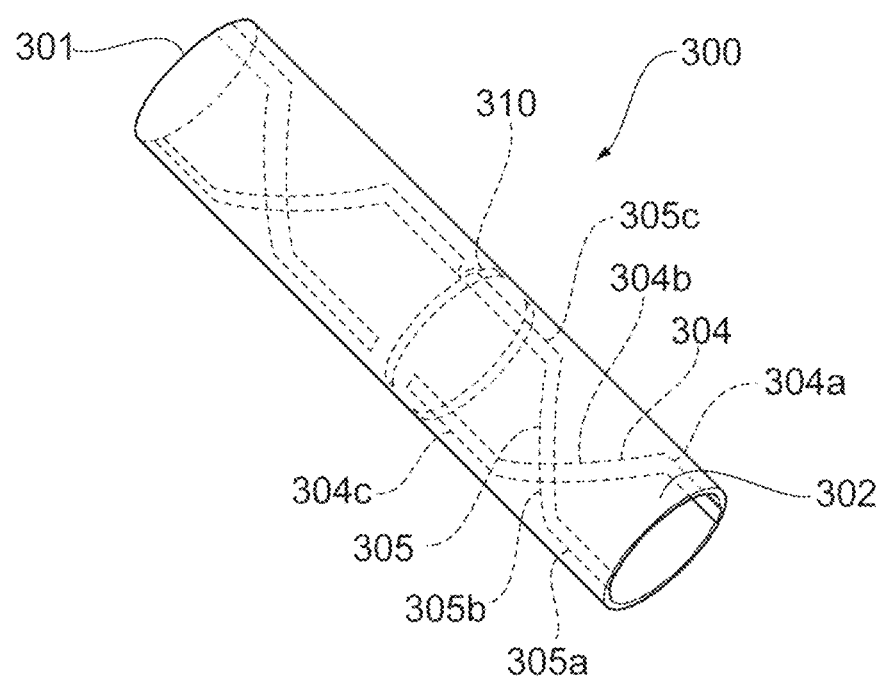
FIG. 22B is a perspective view showing an internal structure of the adapter illustrated in FIG. 22A.

Next, a configuration of the adapter 300 to which the optical connector 210 is connected will be described in detail with reference to FIGS. 22A and 22B. The adapter 300 has a similar configuration to the adapter 100 of the first embodiment, and optically couples the optical connector 210 to another optical connector while adjusting the connected position of each of the optical fibers of the optical connector 210. As illustrated in FIGS. 22A and 22B, the adapter 300 is a substantially cylindrical member and has a through hole 303. The latch member 310 is installed in the through hole 303 and connects each of the optical connectors to the adapter 300. Two pair of arrows 308 and 309 may be provided with the adapter 300 for aligning the optical connector 210 with the adapter 300 when connecting the optical connector 210 to the adapter 300. The pair of arrows 308 are provided at the front side on the outer surface of the adapter 300 at positions of point symmetry with respect to the center axis G or rotational symmetry about the center axis G. The pair of arrows 309 are provided at the rear side on the outer surface of the adapter 300 at positions of point symmetry with respect to the center axis G or rotational symmetry about the center axis G. The pair of arrows 308 may be colored-coded each other, and the pair of arrows 309 may be colored-coded each other.

A pair of guide grooves 304 and 305 which rotates the outer housing 250 about a central axis G with respect to the inner housing 230 or the like by a predetermined angle (for example, 90 degrees) when the optical connector 210 is inserted into the adapter 300, are provided in the adapter 300. The pair of guide grooves 304 and 305 are configured to be point-symmetric about the central axis G. As illustrated in FIG. 22B, the guide groove 304 includes a first straight portion 304a, an inclined portion 304b, and a second straight portion 304c. The inclined portion 304b is inclined with respect to the central axis G. The other guide groove 305 also has a point-symmetric shape and includes a first straight portion 305a, an inclined portion 305b, and a second straight portion 305c. The guide protrusions 54a and 54b of the outer housing 250 are respectively disposed in these guide grooves 304 and 305.

Here, the rotation operation of the outer housing 250 when the optical connector 210 is connected to the adapter 300 will be described with reference to FIG. 23. FIG. 23 is a perspective view showing connection of the optical connector illustrated in FIGS. 18A and 18B to the adapter illustrated in FIGS. 22A and 22B.

As illustrated in FIG. 23, when the optical connector 210 moves forward along the central axis G to connect the optical connector 210 to the adapter 300, the guide protrusions 54a and 54b of the outer housing 250 are respectively inserted into the first straight portions 304a and 305a of the corresponding guide grooves 304 and 305.

Subsequently, when the optical connector 210 is further pushed forward in this state, the guide protrusions 54a and 54b move in the inclined portions 304b and 305b in an inner circumferential direction, and the outer housing 250 rotates about the central axis G with respect to the inner housing 230 or the like according to this movement in the inclined direction (movement in a spiral). During this rotation operation, the distal ends of the optical fibers held by the MT ferrule 40 is cleaned by the cleaner 53 of the outer housing 250.

Subsequently, when the guide protrusions 54a and 54b move to distal ends of the inclined portions 304b and 305b in the adapter 300, the guide protrusions 54a and 54b move to distal ends of the second straight portions 304c and 305c. With this movement, the rear housing 220 or the inner housing 230 moves linearly further forward along the central axis G with respect to the outer housing 250, thus the front portion of the MT ferrule 40 protrudes from the opening regions 52a and 52b of the outer housing 250, and the MT ferrule 40 is in a state in which it can be connected to the MT ferrule of the other optical connector. At this time, the inner housing 230 of the optical connector 210 is engaged and locked by the latches 312 and 313.

Figure 24A:
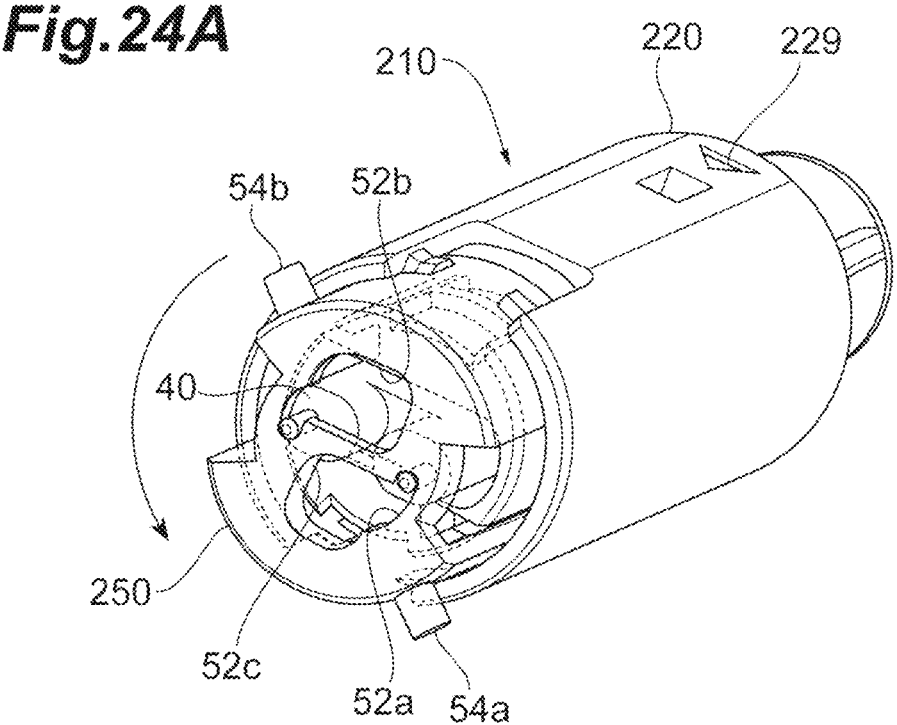
FIG. 24A is a perspective view of the optical connector seen from the front side when the optical connector is in the initial position.
Figure 24B:
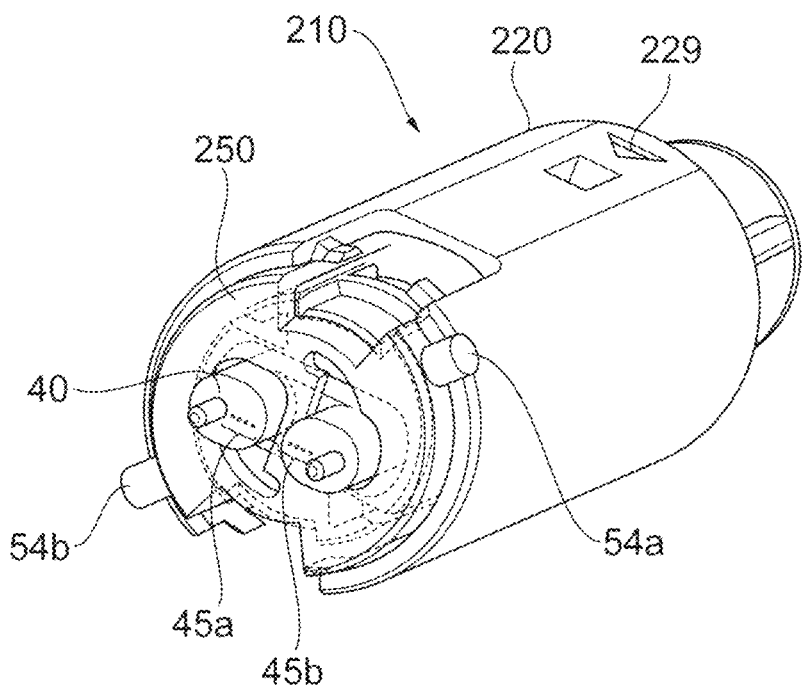
FIG. 24B is a perspective view of the optical connector seen from the front side when the optical connector is in the connected position.

With such an operation, the optical connector 210 is rotated from the initial position (refer to FIG. 18A and FIG. 24A) in which the fiber exposed surface (the openings 45a and 45b) of the MT ferrule 40 is covered by the connecting portion 52c and the cleaner 53, to the connected position (refer to FIG. 18B and FIG. 24B) which the fiber exposed surface of the MT ferrule 40 has been cleaned by the cleaner 53 and protrudes from the opening regions 52a and 52b of the outer housing 250 to be in a connectable state. FIG. 24A is a perspective view of the optical connector when the optical connector is in the initial position, and FIG. 24B is a perspective view of the optical connector when the optical connector is in the connected position. With such a rotation operation, the opening regions 52a and 52b of the outer housing 250 are aligned with the exposed surfaces of the optical fibers of the MT ferrule 40, and the connecting portion 52c is accommodated in the recess 42 of the MT ferrule 40. When the optical connector 210 is removed from the adapter 300, the respective members are returned to the initial position by the MT spring 80 and the spring 280 of the optical connector 210.

Figure 25A:
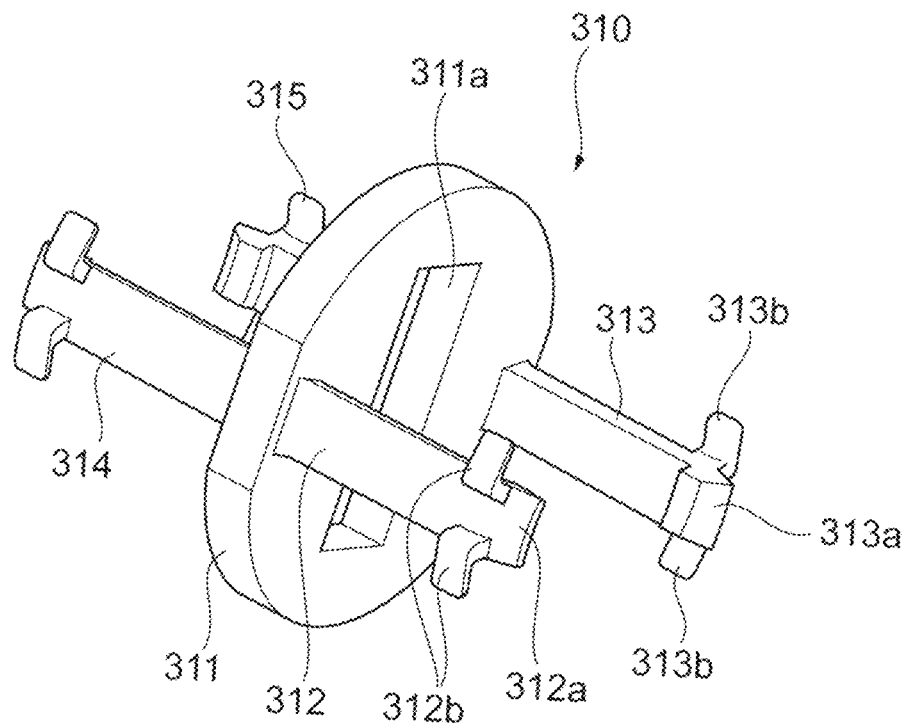
FIG. 25A is a perspective view of a latch member disposed in the adapter illustrated in FIGS. 22A and 22B.
Figure 25B:
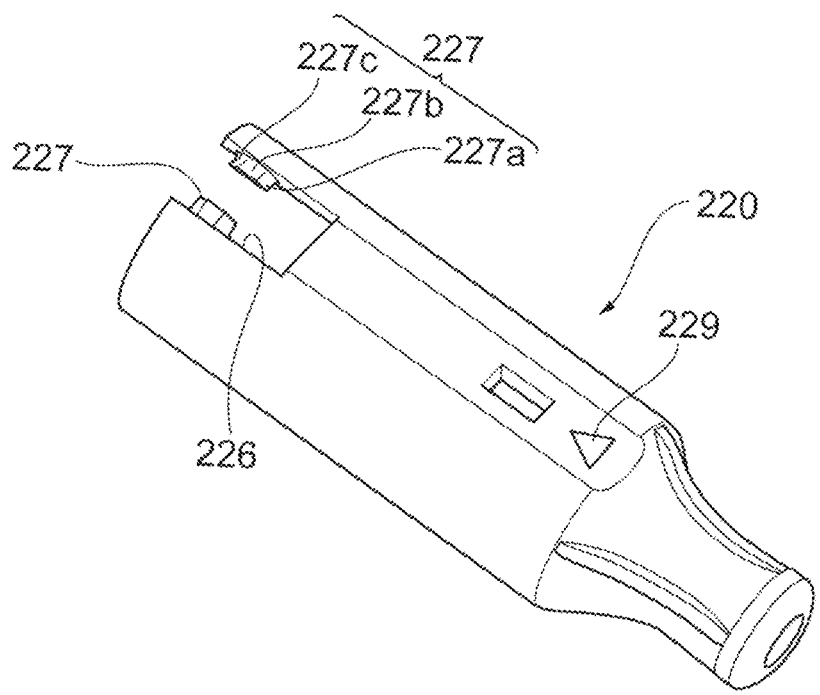
FIG. 25B is a perspective view of the rear housing of the optical connector.
Figure 26A:
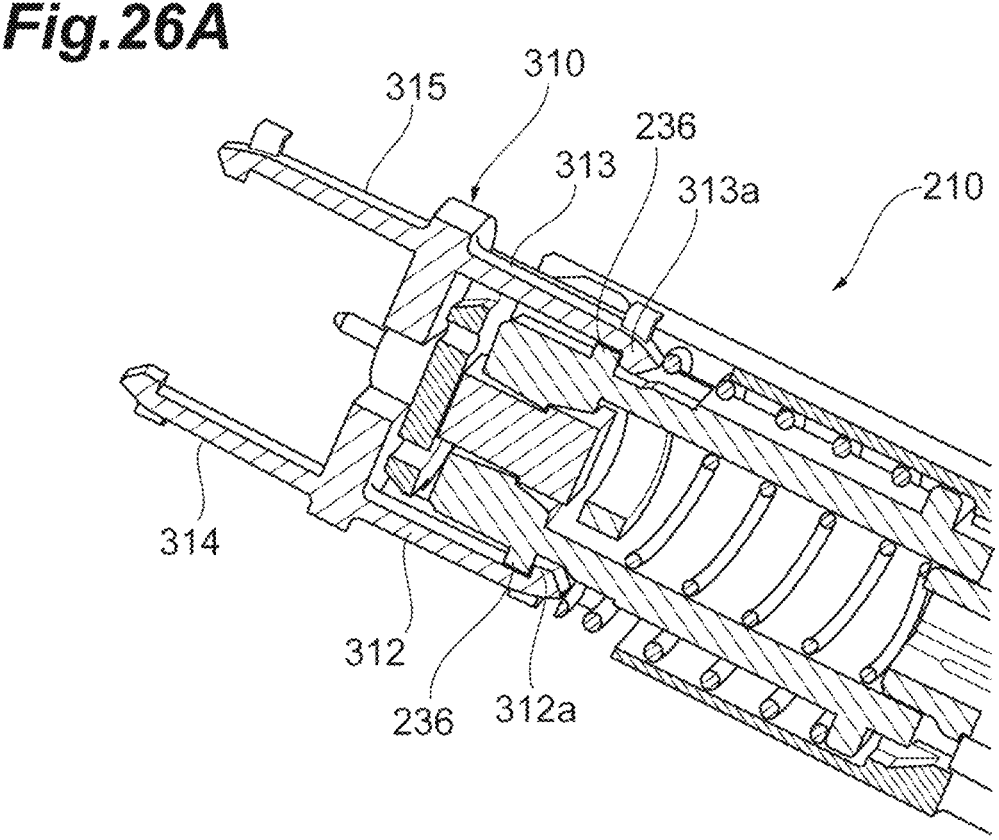
FIG. 26A is a perspective cross-sectional view showing a state in which the latch member is engaged with the inner housing of the optical connector illustrated in FIGS. 18A and 18B.
Figure 26B:
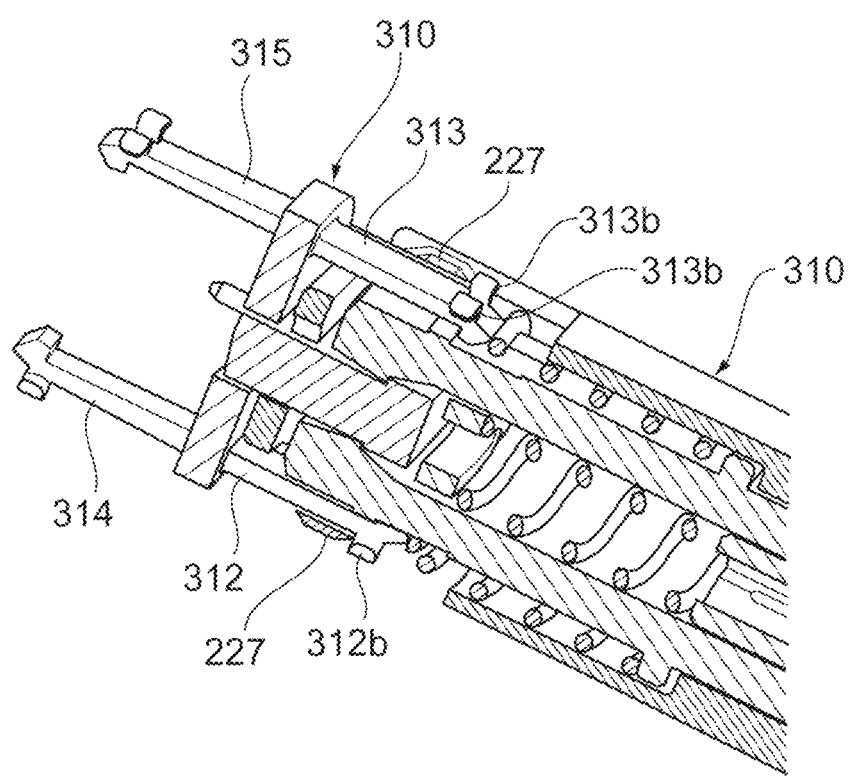
FIG. 26B is a perspective cross-sectional view showing a state in which the engagement state between the inner housing and the latch member is released by the rear housing.

Next, as described above, a mechanism in which the optical connector 210 is engaged and released by the latch member 310 in the adapter 300 when the optical connector 210 is inserted into the adapter 300 will be described with reference to FIGS. 25A and 25B, and FIGS. 26A and 26B. FIG. 25A is a perspective view of a latch member disposed in the adapter, and FIG. 25B is a perspective view of the rear housing of the optical connector. FIG. 26A is a perspective cross-sectional view showing a state in which the latch member is engaged with the inner housing, and FIG. 26B is a perspective cross-sectional view showing a state in which the engagement state between the inner housing and the latch member is released by the rear housing.

As illustrated in FIG. 25A, the latch member 310 includes a disk portion 311, a pair of latches 312 and 313, a pair of latches 314 and 315. The disk portion 311 has the same outer diameter as an inner diameter of the through hole 303 of the adapter 300 and is fixed at a predetermined position inside the adapter 300 (refer to FIG. 23). The latches 312 and 313 are members for fixing the optical connector 210 to the adapter 300, and the latches 314 and 315 are members for fixing another optical connector to the adapter 300. The latches 312 and 313 and the latches 314 and 315 have the same shape, and the configuration of the latches 312 and 313 will be described below, but the configuration of the latches 314 and 315 is also the same.

Hook portions 312a and 313a each have a same configuration as the first embodiment, and are provided at rear distal ends of the latches 312 and 313. Release portions 312b and 313b each have L-shape structure, and are provided on both edges of each of the hook portions 312a and 313a. The hook portions 312a and 313a are engaged with the latch step 236 (refer to FIG. 20B) of the inner housing 230 located in the opening 226 of the rear housing 220, and fix the optical connector 210 to the adapter 300 when the optical connector 210 is inserted into the adapter 300. FIG. 26A shows a state in which the hook portions 312a and 313a of the latches 312 and 313 are engaged with the latch steps 236 of the inner housing 230 in this way. When the optical connector 210 is engaged with the latch member 310, the exposed surfaces 43a and 43b of the MT ferrule 40 are located in an opening portion 311a of the disk portion 311 of the latch member 310. Thus, the optical connector can be optically coupled to the counterpart optical connector.

When the optical connector 210 is removed from the adapter 300 after the latch member 310 is engaged with the inner housing 230, an operation in which the optical connector 210 is pulled out from the adapter 300 rearward is performed. That is, an operation in which the rear housing 220 is linearly moved rearward with respect to the latch member 310 is performed. At this time, as illustrated in FIG. 26B, the release portions 312b and 313b provided on both edges of the hook portions 312a and 313a climb the first slope 227a of each of the protruding portions 227 to reach the flat portion 227b, and then come down along the second slope 227c. Accordingly, the hook portions 312a and 313a are lifted up outward, and the engagement with the latch step 236 is released.

Please be noted that a method of connecting the optical connector 210 having the above-described configuration to another optical connector using the adapter 300 is same as the method of connecting the optical connector 10 according to the first embodiment to another optical connector using the adapter 100, and then overlapped description is omitted.

As described above, in the optical connector 210 according to the second embodiment, when the outer housing 250 is rotated from the initial position to the connected position (the rotated position) with respect to the inner housing 230 by the rotation guiding mechanisms including the guide protrusions 54a and 54b and the guide grooves 304 and 305, the opening regions 52a and 52b of the front wall 51 of the outer housing 250 move to positions corresponding to the fiber exposed surfaces of the MT ferrule 40. Since the distal end of the MT ferrule 40, that is, the distal ends of the optical fibers held by the MT ferrule 40 is exposed to the outside (since it is protected until then) when the optical connector 210 is rotated from the initial position to the connected position to connect the optical connector 210 to another connector, according to the optical connector 210, it is possible to curb the adhesion of dust to the end surfaces of the optical fibers. Further, since the outer housing 250 is rotated using the above-described rotation guiding mechanisms, an operation thereof is easy.

The optical connector 210 has guide protrusions 54a and 54b located on the outer surface of the outer housing 250 as the rotation guiding mechanism. Additionally, the outer housing 250 rotates between the initial position and the connected position with respect to the inner housing 230 by the guide protrusions 54a and 54b moving in the guide grooves 304 and 305 provided in the inner peripheral wall of the adapter 300. Therefore, according to such an optical connector 210, the rotation guiding mechanism having a simple structure can be provided. Further, the guide protrusions 54a and 54b are disposed adjacent to the front end 210a of the optical connector 210. Since the guide protrusions 54a and 54b are disposed adjacent to the front end 210a of the optical connector 210, the rotation angle of the outer housing 250 can be increased even when the optical connector 210 is a small connector.

The pair of guide protrusions 54a and 54b and the guide grooves 304 and 305 are formed to be point-symmetric with respect to the central axis G. Thus, the outer housing 250 can be smoothly rotated by the guide protrusions 54a and 54b and the guide grooves 304 and 305.

In the optical connector 210, the outer housing 250 includes the cleaner 53 for cleaning the distal ends of the optical fibers inside the front wall 51. In the case in which the optical connector 210 is rotated from the initial position to the connected position when the optical connector 210 is connected to another connector, the distal end of the MT ferrule 40 can be cleaned by the cleaner 53. The cleaner 53 may be wound around the front wall 51 through the opening regions 52a and 52b.

The optical connector 210 includes the MT ferrule 40 which accommodates the distal end portions of the optical fibers accommodated in the optical fiber cable, and the MT ferrule 40 has the recess 42 at the center of the front end thereof. For example, when the optical connector is downsized, in the case of the ferrule of the related art, the rotation of the outer housing may be hindered. However, downsizing of the optical connector 210 is easily achieved by employing the configuration of the ferrule with a central portion removed, which may otherwise hinder the rotation, as in the embodiment.

As described above, although the optical connectors, the adapters, and the like according to the embodiments have been described, the present invention is not limited thereto, various modifications are applicable. For example, in the optical connectors 10 and 210, the guide protrusions which constitute one configuration of the rotation guide mechanisms are provided on the outer periphery of the outer housing, and the guide grooves which constitute the other configuration of the rotation guide mechanisms are provided on the inner periphery of the adapter 100 and 300. However, conversely, the guide protrusions which constitute one configuration of the rotation guide mechanisms may be provided on the inner periphery of the adapter 100 and/or 300, and the guide grooves which constitute the other of the rotation guide mechanisms may be provided on the outer periphery of the outer housing. Further, although the example in which one MT ferrule is mounted in the optical connector 10 and/or 210 has been described, a structure in which a plurality of ferrules are mounted in the optical connector may be applicable. Moreover, it should be considered that the embodiments and examples disclosed in the specification are illustrative and not restrictive in all respects. The scope of the present invention is defined by the claims rather than the meanings described above and is intended to include any modifications within the scope and meaning equivalent to the claims

What is claimed is:

1. An optical connector having a central axis extending between a front end and a rear end, comprising:
    a rear housing located at the rear end of the optical connector, the rear housing allowing an optical fiber cable to be inserted therethrough;
    an inner housing comprising at least one retaining hole configured to accommodate a ferrule at a distal end thereof, a rear portion of the inner housing being accommodated in the rear housing; and
    an outer housing disposed on an outer periphery of the inner housing to cover a front portion of the inner housing, the outer housing being configured to rotate with respect to the inner housing about the central axis by a rotation guiding mechanism cooperating with an adapter for connecting the optical connector to another optical connector,
    wherein the outer housing includes a front wall covering the distal end of the inner housing, the front wall includes at least one opening region, and the opening region is configured to correspond to a fiber exposed surface of the ferrule when the outer housing is rotated with respect to the inner housing from an initial position to a connected position by the rotation guiding mechanism.

2. The optical connector according to claim 1, wherein the rotation guiding mechanism includes a guide protrusion located on an outer surface of the outer housing.

3. The optical connector according to claim 1, wherein the rotation guiding mechanism includes a pair of guide protrusions located on an outer surface of the outer housing.

4. The optical connector according to claim 3, wherein the pair of guide protrusions are located adjacent to a front end of the optical connector.

5. The optical connector according to claim 3, wherein the pair of guide protrusions are symmetrically located with respect to the central axis.

6. The optical connector according to claim 1, further comprising:
    a resilient member pressing the outer housing toward the front end and pressing the rear housing toward the rear end.

7. The optical connector according to claim 1,
wherein the outer housing comprises a cleaner inside the front wall, the cleaner cleaning a distal end of an optical fiber.

8. The optical connector according to claim 7,
wherein the cleaner is wound around the front wall through the opening region.

9. The optical connector according to claim 1, further comprising:
a ferrule accommodating a distal end portion of at least one of optical fibers accommodated in the optical fiber cable, the ferrule being provided with a recess at a center of the front end of the ferrule.

10. The optical connector according to claim 1, further comprising:
an optical fiber cable including a plurality of optical fibers accommodated therein, the optical fiber cable being inserted through the rear housing; and
a holding member holding the optical fiber cable inside the rear housing.

11. An optical connecting structure comprising:
the optical connector according to claim 1, and
the adapter configured to connect the optical connector to the another optical connector.

12. The optical connecting structure according to claim 11,
wherein the rotation guiding mechanism comprises:
a guide groove provided on an inner peripheral surface of the adapter, the guide groove comprising an inclined portion inclining with respect to the central axis; and
a guide protrusion located on an outer peripheral surface of the outer housing, the guide protrusion protruding toward the guide groove,
wherein the outer housing rotates with respect to the inner housing between the initial position and the connected position due to a movement of the guide protrusion in the guide groove.

13. The optical connecting structure according to claim 11,
wherein the rotation guiding mechanism comprises:
a pair guide grooves provided on an inner peripheral surface of the adapter, the pair of guide grooves each comprising an inclined portion inclining with respect to the central axis; and
a pair of guide protrusions located on an outer peripheral surface of the outer housing, the pair of guide protrusions protruding respectively toward the corresponding guide grooves,
wherein the outer housing rotates with respect to the inner housing between the initial position and the connected position due to movements of the guide protrusions in the corresponding guide grooves.

14. The optical connecting structure according to claim 13,
wherein each of the pair of guide grooves comprises a first straight portion and a second straight portion extending respectively from both ends of the inclined portion along the central axis.

15. The optical connecting structure according to claim 11,
wherein the adapter further comprises a latch to engage with the inner housing of the optical connecter.

16. The optical connecting structure according to claim 15,
wherein the rear housing of the optical connector further comprises a releasing portion having a slope to release the latch of the adapter after the optical connector is inserted into the adapter and locked to the adapter by the latch.

17. The optical connecting structure according to claim 16,
wherein the releasing portion has a protruding shape toward outside of the optical connector, and the protruding shape includes the slope.

18. The optical connecting structure according to claim 16,
wherein the rear housing further comprises a cutout configured to expose a protrusion of the inner housing, the protrusion being configured to engage with the latch of the adapter, and
wherein the releasing portion is located adjacent to an edge of the cutout.

19. A method of connecting the optical connector according to claim 1 to another optical connector using the adapter, the method comprising the steps of:
(a) aligning a first structure of the rotation guiding mechanism provided on the outer housing with a second structure of the rotation guiding mechanism provided on the adapter;
(b) linearly moving the outer hosing toward the adapter along the central axis after Step (a); and
(c) converting the linear movement of the outer housing into a rotational movement of the outer housing by the rotational guiding mechanism provided on the outer housing and the adapter to rotate the outer housing from the initial position to the connected position,
wherein the fiber exposed surface of the ferrule is located in the opening region provided in the front wall of the outer housing in Step (c), and the fiber exposed surface of the ferrule is pushed out from the front wall to an inside of the adapter.

20. A method of releasing the optical connector connected to the another optical connector by the method according to claim 19 from the adapter, the method comprising the step of:
(d) pulling the rear housing or the outer housing away from the adapter to rotate the outer housing from the connected position to the initial position by the rotation guiding mechanism.

* * * * *